(12) United States Patent
MacIntosh et al.

(10) Patent No.: US 7,403,220 B2
(45) Date of Patent: Jul. 22, 2008

(54) APPARATUS, METHODS, AND SYSTEMS FOR VIEWING AND MANIPULATING A VIRTUAL ENVIRONMENT

(75) Inventors: David MacIntosh, San Diego, CA (US); David Morelock, Santee, CA (US); Joseph Grand, San Diego, CA (US)

(73) Assignee: Gamecaster, Inc., San Diego, CA (US)

( * ) Notice: Subject to any disclaimer, the term of this patent is extended or adjusted under 35 U.S.C. 154(b) by 8 days.

(21) Appl. No.: 11/177,049

(22) Filed: Jul. 9, 2005

(65) Prior Publication Data
US 2006/0038890 A1  Feb. 23, 2006

Related U.S. Application Data

(60) Provisional application No. 60/603,708, filed on Aug. 23, 2004.

(51) Int. Cl.
*H04N 5/228* (2006.01)
(52) U.S. Cl. .................................................. 348/208.2
(58) Field of Classification Search ............... 348/208.2
See application file for complete search history.

(56) References Cited

U.S. PATENT DOCUMENTS

| | | | | |
|---|---|---|---|---|
| 5,440,326 A | 8/1995 | Quinn | .................. | 345/156 |
| 5,479,597 A | 12/1995 | Fellous | .................. | 395/154 |
| 5,825,350 A | 10/1998 | Case, Jr. et al. | .................. | 345/163 |
| 5,898,421 A | 4/1999 | Quinn | .................. | 345/156 |
| 6,126,547 A | 10/2000 | Ishimoto | .................. | 463/42 |
| 6,161,933 A | 12/2000 | Tschida et al. | .................. | 352/179 |
| 6,193,610 B1 | 2/2001 | Junkin | .................. | 463/40 |
| 6,409,599 B1 | 6/2002 | Sprout et al. | .................. | 463/31 |
| 6,783,460 B2 | 8/2004 | Galyean, III et al. | .................. | 463/40 |
| 7,050,102 B1 * | 5/2006 | Vincent | .................. | 348/333.02 |
| 2002/0122113 A1 * | 9/2002 | Foote | .................. | 348/48 |
| 2005/0212911 A1 * | 9/2005 | Marvit et al. | .................. | 348/154 |

FOREIGN PATENT DOCUMENTS

| | | |
|---|---|---|
| WO | WO 96/14584 | 5/1996 |
| WO | WO 2003/088204 A1 | 10/2003 |
| WO | WO 2004/099903 A2 | 11/2004 |

OTHER PUBLICATIONS

International Searching Authority/US International Search Report and Written Opinion for PCT/US 05/24439 Jan. 20, 2006.

* cited by examiner

*Primary Examiner*—James M Hannett
(74) *Attorney, Agent, or Firm*—T D Foster; M. Reza Savari

(57) ABSTRACT

Components for generating, reviewing, processing, storing, retrieving, analyzing, and optimizing information input to or output from a virtual environment. The components may be a video camera component, a stand-alone or device mountable on a tripod to permit a camera person to select from one or more views within a virtual environment, such as a video game being executed, and to provide alternative views within the confines of the virtual environment. The component permits selection from multiple views and manipulation of the same, including a rotation leftward or rightward, a tilt upward or downward, a zooming inward or outward, a translation (for example, a track movement) leftward, rightward, forward, or backward, a rolling movement, and a camera position adjustment (for example, crane movement) upward or downward.

46 Claims, 26 Drawing Sheets

APPARATUS, METHODS, AND SYSTEMS FOR VIEWING AND MANIPULATING A VIRTUAL ENVIRONMENT

CLAIM OF PRIORITY UNDER 35 U.S.C. §119

The present Application for Patent claims priority to Provisional Application No. 60/603,708 entitled "Apparatus, Methods, and Systems for Viewing a Virtual Environment" filed Aug. 23, 2004, and assigned to the assignee hereof and hereby expressly incorporated by reference herein.

BACKGROUND OF THE INVENTION

Portions of the disclosure of this patent document may contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

1. Field of the Invention

The present invention relates generally to the field of virtual systems, and more particularly to a system wherein a virtual video game producer, director, camera person, or other individual manipulates a virtual interface device within the virtual game space.

2. Related Art

It is economically unwise to underestimate the global growth of virtual systems, which includes the prolific video game industry. In each of years 2003 and 2004, annual United States retail sales of video games, including portable and console hardware, software and accessories, reached approximately $10 billion dollars, which is the same amount as released movies earned at the box office in those years. One conservative forecast estimates that the global video game industry will more than double its estimated 2004 revenues to $24.5 billion by 2008.

Given the sheer size and expectation of growth for this market sector, few advances have occurred with respect to broadcasting and viewing of virtual systems in general, and video games in particular. For example, a number of virtual video game controllers for playing various types of video games are commercially available, and many of these controllers allow a player to move within the virtual environment of the game being played using a variety of buttons, video game controllers, triggers, and similar command means. However, while there has been a trend to produce more effective and user friendly video game controllers, further improvements for ease of play and effectiveness of these controllers for third party viewers are highly desirable.

In particular, although the aforementioned video controllers allow players to move within the virtual environment of the videogame, they are inefficient and difficult to use in allowing a third-party viewer of the game to move within the virtual environment of the video game as an observer of the play action. Moreover, little in the way of a professionally operated and edited viewing environment has been made available to virtual system fans and aficionados. What is needed are apparatus, methods and systems permitting fans and aficionados of virtual systems, including video games, to view action packed, real-time or delayed-time, professionally edited and viewable video images. More generally, what is needed are apparatus, methods and systems permitting any person or machine to more accurately and professionally generate, review, process, store, retrieve, analyze, and optimize information input to or output from a virtual environment.

SUMMARY OF THE INVENTION

To address one or more of the drawbacks of the prior art, the disclosed embodiments provide apparatus, methods and systems for viewing and otherwise manipulating a virtual environment. In one or more embodiments, components are provided for generating, reviewing, processing, storing, retrieving, analyzing, and optimizing information input to or output from a virtual environment.

In one or more embodiments, the components may comprise, for example, video camera components. The video camera components may be stand-alone devices, or alternatively, devices mountable on a tripod or other camera mounting equipment. The video camera components permit a user, such as a camera person, to select from one or more views within a virtual environment, such as a video game being executed, and to provide alternative views within the confines of the virtual environment.

Each video camera component permits a person operating such component, as for example a camera person, to select from multiple views, and to manipulate the video camera component in a predefined or user defined fashion. Exemplary movements include a rotation leftward or rightward, a tilt upward or downward, a translation (for example, a track movement) leftward, rightward, forward, or backward, a rolling leftward or rightward, a zooming inward or outward, and a camera position adjustment (for example, crane movement) upward or downward.

In one embodiment, the video camera component is designed to provide video capture from within the virtual environment that emulates very closely video capture from real world events. Accordingly, the video camera component may permit a professional motion picture camera person to extract views and employ devices recognized in the motion picture art resulting in video images of virtual environments having the attributes of video capture of real world events.

In the disclosed embodiments, related apparatus, methods and systems permit one or more directors to select between a multitude of views provided by the foregoing video camera components, as well as additional views, including views determined by one or more controllers operated by the directors, and the individuals primarily involved in the virtual environment, such as video game players. The selection may be performed in real-time or delayed-time, resulting in professional grade digital video footage of virtual environments having the attributes of professional video capture of real world events. As one example, during a head-to-head video game match, a sports television director can place multiple sports camera persons within the video game, and direct a multi-camera live switch, delivering an exciting spectator experience.

The disclosed embodiments are not limited to the foregoing examples, but can apply to any virtual type of environment, including for example, a virtual reality system, an augmented reality system, a video game system, and a virtual movie, including systems augmented with or based upon real-world input/output and artificial intelligence or its derivatives.

For example, the disclosed embodiments can be used to extract, process and store delayed-time or real-time inputs to and outputs from video film taken from within an individual's body, in order to extract virtual video from different perspectives for diagnostic testing, and to provide output to laser surgical apparatus for surgery. Additional embodiments include (i) digital filmmaking, (ii) simulations of military equipment and personnel readiness during war games, (iii) flight simulation training for pilots, (iv) modeling simulations for biological, chemical and molecular analyses, (v) simulations related to graphical rendering of building facilities for architects, builders, and governmental registration authorities, and (vi) any other simulations that may be contemplated.

Unless defined otherwise, all technical and scientific terms used herein have the same meaning as commonly understood by one of ordinary skill in the art to which the disclosed embodiments belong. Where a term is provided in the singular, the inventor also contemplates the plural of that term.

All headings are for the convenience of the reader and should not be used to limit the meaning of the text that follows the heading, unless so specified. Various changes and departures may be made to the disclosed embodiments without departing from the spirit and scope thereof. Accordingly, it is not intended that the disclosed embodiments be limited to any specifically described embodiment in the specification or as illustrated in the examples, but only as set forth in the claims.

Further objectives and advantages of the disclosed embodiments will become apparent when taken in conjunction with the accompanying drawings. To gain a full appreciation of the scope of the disclosed embodiments, it will be further recognized that various aspects of the disclosed embodiments can be combined to make desirable embodiments of the invention.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

TABLE OF CONTENTS

I. EXEMPLARY EMBODIMENT

II. NODE-NODE ENVIRONMENT

III. MACHINE INSTRUCTIONS ENVIRONMENT

IV. COMPUTER HARDWARE ENVIRONMENT

V. CLIENT-SERVER ENVIRONMENT; INTERNET

VI. EXEMPLARY EMBODIMENTS

VII. CONCLUSION

I. Exemplary Embodiment

While specific exemplary examples, environments and embodiments are discussed below, it should be understood that this is done for illustration purposes only. A person skilled in the relevant art will recognize that other components and configurations can be used without parting from the spirit and scope of the invention. In fact, after reading the following description, it will become apparent to a person skilled in the relevant art how to implement the invention in alternative examples, environments and embodiments.

II. Node-Node Environment

In one or more embodiments, the invention is practiced in the environment of a computer network or networks. The network can include a private network, or a public network (for example the Internet, as described below), or a combination of both. The network includes hardware, software, or a combination of both.

As skilled persons will recognize, from a high-level, telecommunications-oriented view, the network can be described as a set of hardware nodes interconnected by a communications facility, with one or more processes (hardware, software, firmware, or a combination thereof) functioning at each such node. The processes can inter-communicate and exchange information with one another via communication pathways between them called interprocess communication pathways.

On these pathways, appropriate communications protocols are used. Skilled persons will recognize that the distinction between hardware, software and firmware is not always easily defined, with the same or similar functions capable of being preformed with use of either. This is especially true for functionality associated with the communications between processes.

Figure 1:
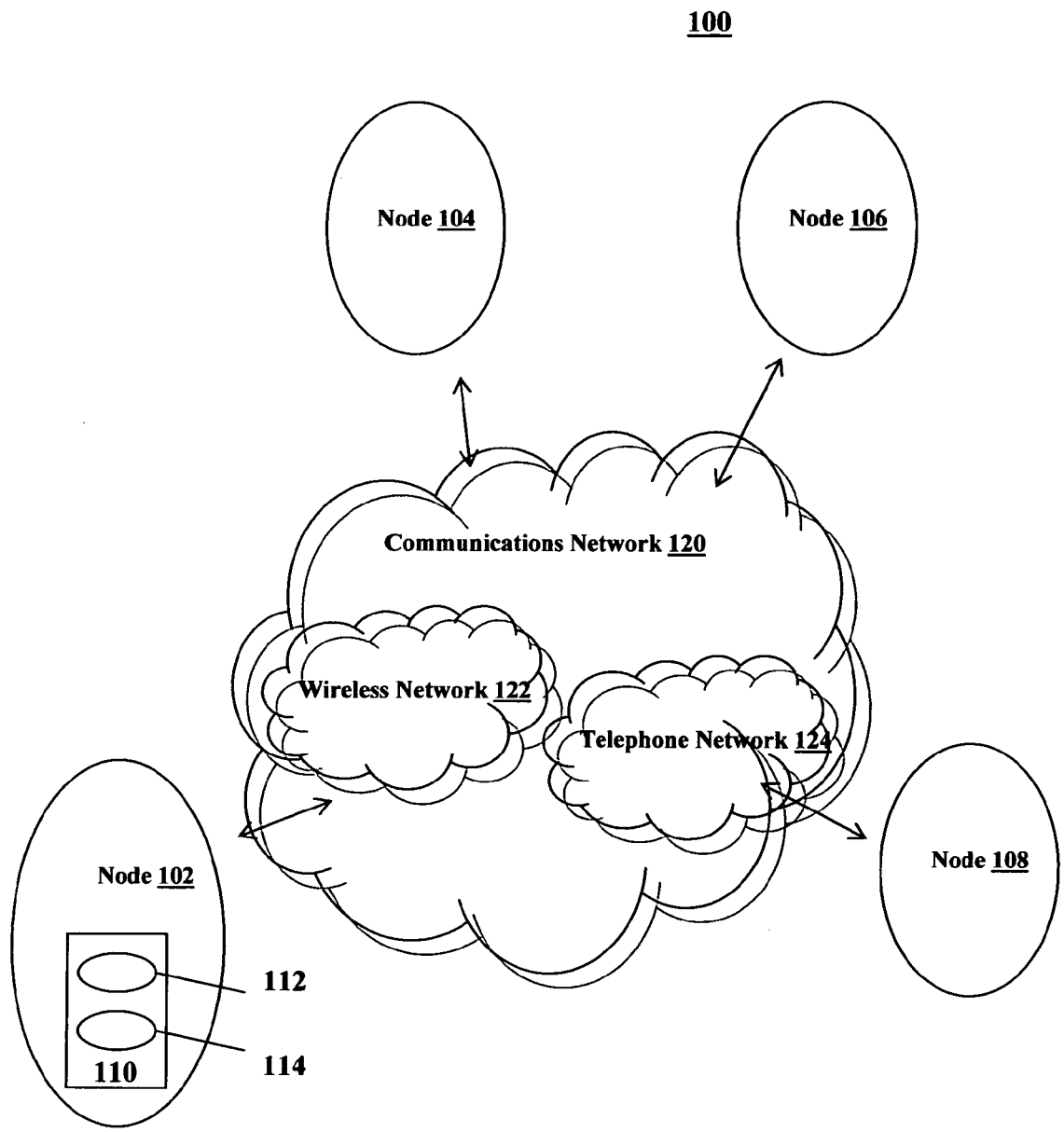
FIG. 1 illustrates a representative view of nodes operating in a communications network environment.

FIG. 1 illustrates an exemplary computer and telecommunications network environment 100. Environment 100 includes nodes 102, 104, 106, 108, which include hardware, software, firmware, or a combination of hardware and software. Nodes 102-108 are interconnected via communications network 120. Communications network 120 includes one ore more wireless networks 122, and one or more telephone networks 124, interconnected together through communications pathways.

Each node 102-108 includes one or more processes 112, 114, executable by processors 110 incorporated into the nodes. The processes 112, 114 can include any executable instructions, including any combination of hardware, firmware, or software, including source code, binary code, machine code, in the form of any applets, applications, modules, processes, and any subcomponents of the foregoing, regardless of whether operable by one or more processors 112, 114 resident on or remote from the nodes 102-108.

It is possible that a single process 112 can be run by multiple processors 110, or that multiple processes 112, 114 can be run by a single processor 110. Processor 110 can comprise any combination of processors, including an application-specific integrated circuit ("ASIC"), a chipset, a processor, a microprocessor, a logic circuit, and any other data processing device, functioning in association with related memory, including read-only memory ("ROM"), random-access memory ("RAM"), EPROM, EEPROM, flash memory cells, secondary or tertiary storage devices, such as magnetic media, optical media, tape, or soft or hard disk, whether resident on node 102 or remotely accessible from node 102.

Additionally, each of nodes 102-108 can provide an interface point between network 100 and the outside world. In addition, each node 102-108 can incorporate a collection of subnetworks, comprising one or more portions of communications network 120, whose features and functions are described in greater detail below. As one example, processes 112, 114 are "software" processes 112, 114 that include software and/or hardware entities that perform work over time, such as tasks, threads, and intelligent agents. Also, each process 112 can refer to multiple processes, for carrying out instructions in sequence or in parallel, continuously or intermittently.

In one embodiment, the processes 112, 114 communicate with one another through interprocess communication pathways supporting communication through any communications protocol. The pathways can function in sequence or in parallel, continuously or intermittently. The pathways can use any of the communications standards, protocols or technologies, described below with respect to communications network 120, in addition to standard parallel instruction sets used by many computers.

Nodes 102-108 include any entities capable of performing their respective processing functions. Examples of nodes 102-108 that can be used with the described embodiments include computers (such as personal computers, laptops, workstations, servers, mini computers, mainframes, or combination of the foregoing), handheld wireless and/or wireline devices (such as cellular telephones, personal digital assistants (PDAs), modern cell phones with processing capability, wireless e-mail and/or two-way text pagers, including BlackBerry™ devices), document processing devices (such as scanners, printers, facsimile machines, or multifunction document machines), complex entities (such as local-area networks or wide area networks) to which are connected a collection of processors, as described, and any ancillary equipment (such as wireline and wireless communications portals, modems, PCMCIA cards and access terminals). As one example, in the context of the disclosed embodiments, a node itself can be a wide-area network (WAN), a local-area network (LAN), a private network (such as a Virtual Private Network (VPN)), or collection of networks, having one or more of the aforementioned devices interconnected and running in such environment.

Communications between nodes 102-108 is made possible by communications network 120. A node 102-108 can be connected either continuously or intermittently with communications network 120. As an example, in the context of the disclosed embodiments, communications network 108 can be a digital communications infrastructure providing adequate bandwidth and information security.

Communications network 120 can include wireline communications capability via telephone network 124, wireless communications capability via wireless network 122, or a combination of both, at any frequencies, using any type of standard, protocol or technology. In addition, in the present invention, communications network 120 can be a private network (for example, a VPN) or a public network (for example, the Internet).

A non-exclusive list of networks comprising, in whole or in combination, wireless network 122 includes: a cellular telephone network; a Bluetooth® technology network; a wideband network (including); a microwave network; a satellite network; a short-range wireless network; a home radio frequency (HomeRF) network; an infrared network, including an Infrared Data Association (IrDA); a shared wireless access protocol (SWAP) network; and a land mobile radio network.

A non-inclusive list of exemplary wireless protocols and technologies used by communications network 120 includes BlueTooth™; private communications service (PCS); a public or private Internet; a public or private Intranet; wireless fidelity alliance (Wi-Fi Alliance); wireless Ethernet compatibility alliance (WECA); 802.11; short range wireless, microwave or infrared (such as Infrared Data Association (IrDA)); and satellite networks; home radio frequency (HomeRF); shared wireless access protocol (SWAP); land mobile radio; global system for mobile communications (GSM); general packet radio service (GPRS), cellular digital packet data (CDPD), mobile solutions platform (MSP), multimedia messaging (MMS), wireless application protocol (WAP), code division multiple access (CDMA), wide code division multiple access (WCDMA), short message service (SMS), wireless markup language (WML), handheld device markup language (HDML), binary runtime environment for wireless (BREW), radio access network (RAN), and packet switched core networks (PS-CN).

Also included are various generation wireless technologies. These generational wireless technologies include 1G, 2G, 2.5G, 3G and 4G. 1G refers to the first generation wide area wireless (WWAN) communications systems, dated in the 1970s and 1980s. These devices are analog, designed for voice transfer and circuit-switched, and include AMPS, NMT and TACS. 2G refers to second generation WWAN communications, dated in the 1990s, characterized as digital, capable of voice and data transfer, and include HSCSD, GSM, CDMA IS-95-A and D-AMPS (TDMA/IS-136). 2.5G refers to the generation of WWAN communications between 2G and 3G. 3G refers to third generation WWAN communications systems recently coming into existence, characterized by data rates of 144 Kbps to over 2 Mbps (high speed), being packet-switched, and permitting multimedia content, including GPRS, 1xRTT, EDGE, HDR, W-CDMA. 4G refers to fourth generation WWAN communications systems, expected to come in the years 2006-2010, characterized by very high-speed (over 20 Mbps) data rates, permitting high-resolution for video.

A exemplary non-inclusive list of primarily wireline protocols and technologies used by communications network 120 includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Furthermore, the processes 112, 114 and processors 110 need not be located at the same physical locations. In other words, each processor 112, 114 can be executed at one or more geographically distant processor 110, over for example, a LAN or WAN connection. Persons of skill in the art will appreciate a great range of possibilities for practicing the invention using different networking hardware and software configurations.

Figure 2A:
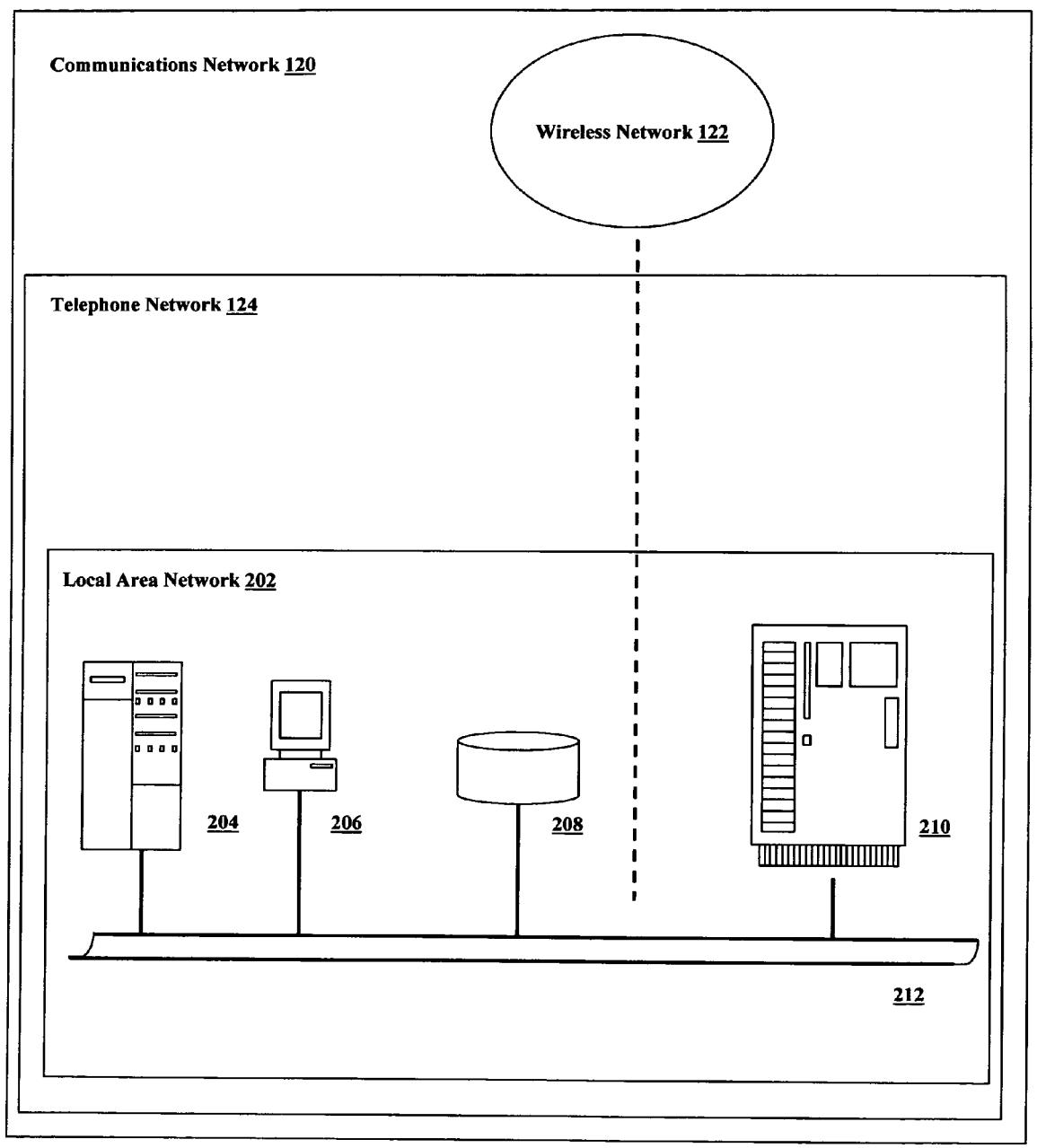
FIG. 2A illustrates a block diagram view of a local area network operating within a communications network.

FIG. 2A is a block diagram illustrating an exemplary embodiment of telephone network 124. FIG. 2A shows a local area network (LAN) 202 within telephone network 124 of communications network 120. Specifically, LAN 202 includes management server 204, personal desktop computer 206, data module 208, and mainframe 210 connected over data bus 212. LAN 202 is connected to other network components and/or nodes 102-108 of wireless network 122 within communications network 120. LAN 202 may comprise either one or more nodes 102-108 within telephone network 124, or alternatively, one or more network components of telephone network 124.

Management server 204 or computer 206 can be in communication over LAN 212 with a separate data bank 208 for storing the gathered data, including the data that is gathered from one or more of nodes 102-108. Mainframe 210 can be a data server. For example, data server 210 can be in communication with management server 204 or computer 206 to provide data flow control and post-processing capabilities. Management server 204, data bank 208 and data server 210 may be present on the illustrated network with any other network components that are needed to provide cellular telecommunication services. In one embodiment, management server 204, computer 206 and/or data server 210 communicate with wireless network 122 through a data link such as the Internet over a secure LAN, WAN, or other comparable network.

Figure 2B:
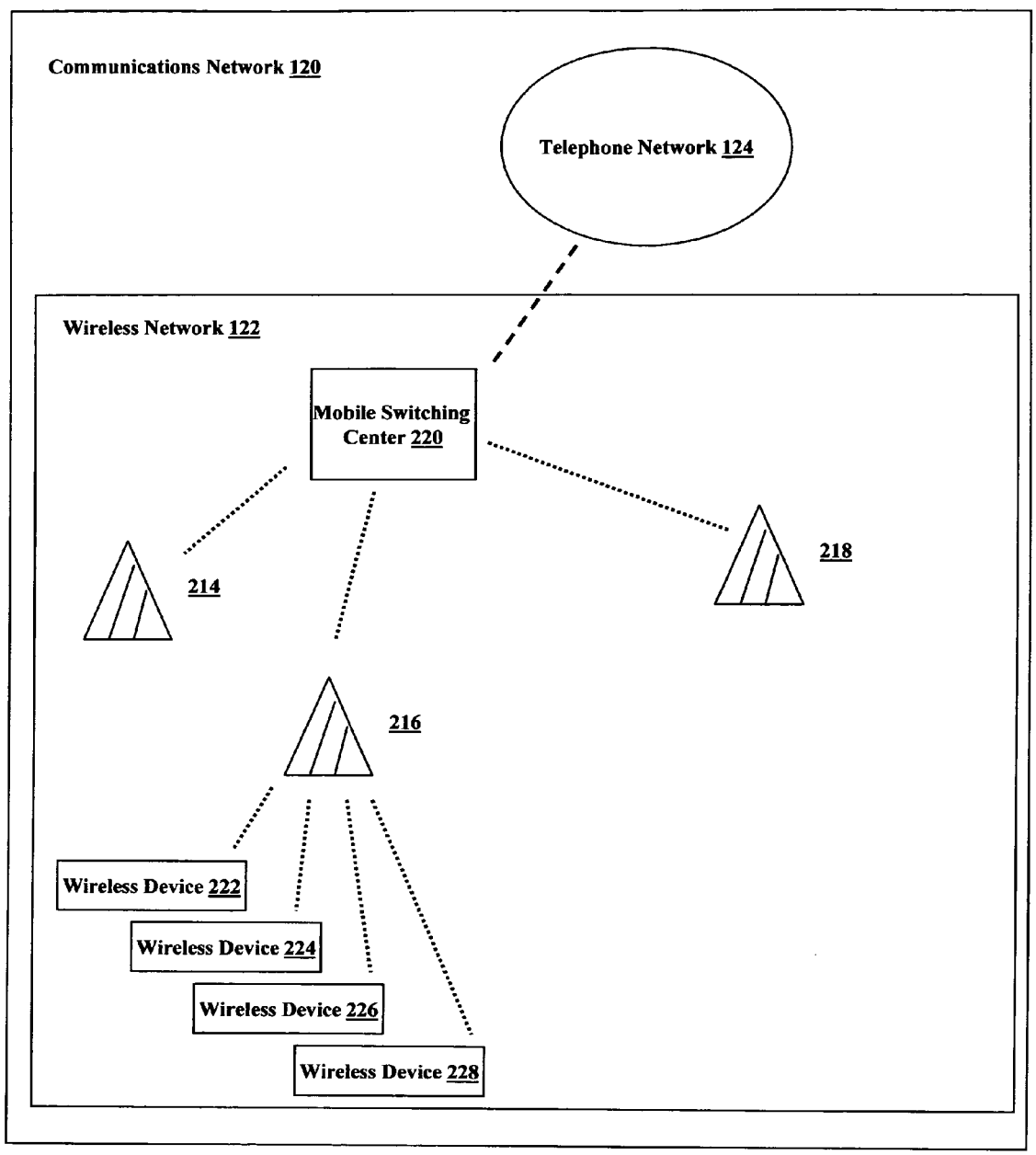
FIG. 2B illustrates a block diagram view of a wireless network operating within a communications network.

FIG. 2B is a block diagram illustrating an exemplary embodiment of wireless network 122 of communications network 120. Wireless network 122 includes one or more mobile switching centers (MSCs) 220 wirelessly connected to one or more base station subsystems (BSSs) 214, 216, 218, wirelessly connected to one or more wireless devices 222, 224, 226 and 228. Wireless network 122 may comprise one or more nodes 102-108 within communications network 120, or alternatively, one or more network components (wireless network 122) of communications network 120.

MSCs 220 are central switching points to which each call is connected to control the routing of the call. MSCs 220 permits wireless devices 222-228 to move freely from cell to cell with continuation of the placed calls. BSSs 214-218 are comprised of one or more base transceiver stations (BTSs), which are land-based stations in wireless network including transceivers and antennas to handle the radio interface to a wireless device mobile station, controlled by one or more mobile control processing devices called base station controllers (BSCs). Wireless network 122 can carry data, switched voice communication, or a combination of both. For example, wireless network 122 can include an Internet portion for data transfer and a switched voice services portion for voice information transfer.

In one or more embodiments, wireless devices 222-228 can include modern cellular telephones manufactured to handle advanced computing capabilities, comprising individual personal computers or hand-held PDAs. The wireless devices 222-228 can communicate voice and data packets over wireless network 122. In one embodiment, wireless devices 222-228 include application programming interfaces (APIs) onto their local or remotely accessible processing platforms, allowing software applications that operate on the wireless devices 222-228 and control functionalities on the devices.

III. Machine Instructions Environment

In one or more embodiments, the steps associated with the disclosed embodiments are embodied in machine-executable instructions. The instructions can be used to cause a processing device, for example a general-purpose or special-purpose processor, which is programmed with the instructions, to perform the steps of the disclosed embodiments.

Alternatively, the steps of the disclosed embodiments can be performed by specific hardware components that contain hardwired logic for performing the steps, or by any combination of programmed computer components and custom hardware components.

For example, the disclosed embodiments can be provided as a computer program product. In this environment, the disclosed embodiments can include a machine-readable medium having instructions stored on it. The instructions can be used to program any processor (or other electronic devices) to perform a process according to the disclosed embodiments.

The machine-readable medium can include, for example, floppy diskettes, optical disks, DVDs, CD-ROMs, and magneto-optical disks, ROMs, RAMs, EPROMs, EEPROMs, magnet or optical cards, or other type of media/machine-readable medium suitable for storing electronic instructions, but is not limited to the foregoing.

In addition, the disclosed embodiments can also be downloaded as a computer program product. Here, the program can be transferred from a remote computer (e.g., a server) to a requesting computer (e.g., a client) by way of data signals embodied in a carrier wave or other propagation medium via a communication link (e.g., a modem or network connection).

IV. Computer Hardware Environment

Figure 3A:
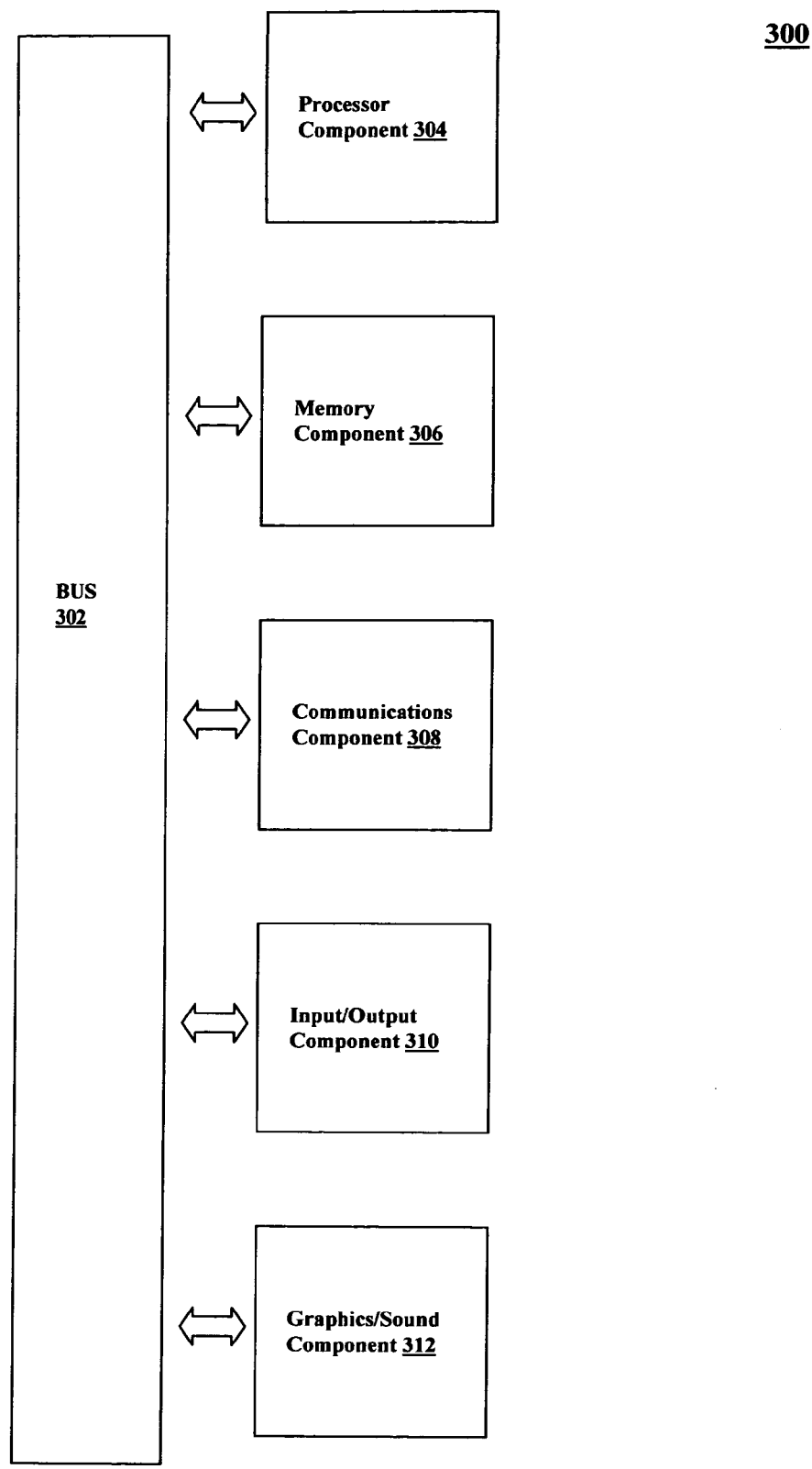
FIG. 3A illustrates a block diagram view of the respective components comprising a computer processing system.

In one embodiment, as illustrated in system 300 of FIG. 3A, each node 102-108 comprises a bus 302, and one or more components communicating with bus 302. Specifically, as illustrated, the components can comprise a processor component 304, a memory component 306, a communications component 308, an input/output component 310, and a graphics/sound component 312. The features and functions of the foregoing components are described in greater detail with reference to FIGS. 3B-8 below.

Figure 3B:
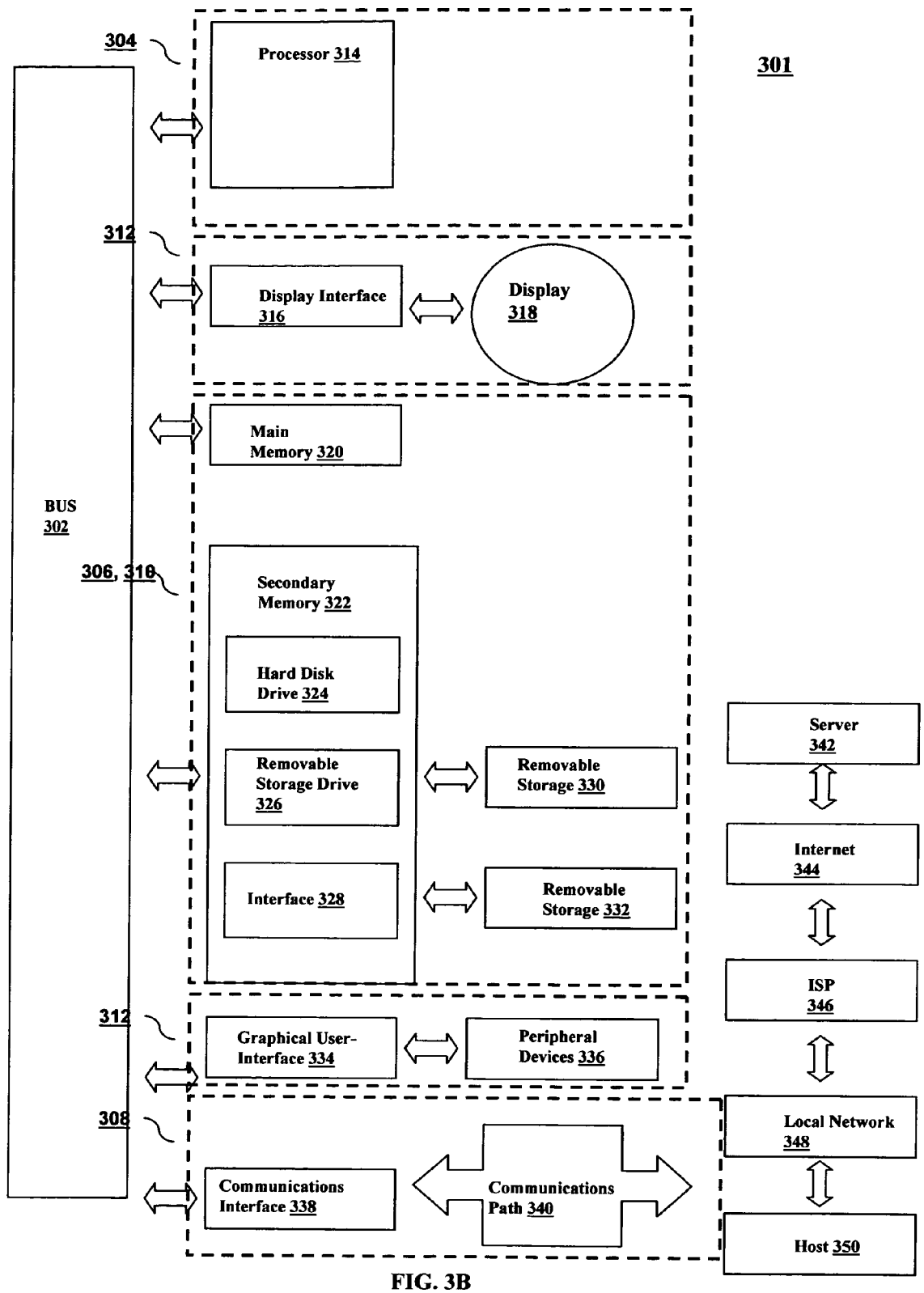
FIG. 3B illustrates a block diagram view of a generic processing system comprising the system of FIG. 3A.

FIG. 3B illustrates one embodiment of system 300, where exemplary node 102 is a general computer system 301, including its ancillary and related components, features and functions. Processor component 304 of computer system 301 includes processor 314. Graphics/sound component 312 of computer system 301 includes display interface 316, display 318. Graphics/sound 312 also includes graphical user-interface 334 and peripheral devices 336, and may additionally include a graphics subsystem.

Memory component 306 and input/output component 310 of computer system 301 are combined to include main memory 320, secondary memory 322 (including hard disk drive 324, removable storage drive 326, and interface 328), and removable storage units 330, 332.

Communications component 308 of computer system 301 includes communications interface 338 and communications path 340. Computer system 301 is connected via communications path 340 to external networks. Various embodiments are described in terms of this example computer system. After reading this description, it will be apparent to a person skilled in the relevant art how to implement the invention using other computer systems and/or computer architectures.

Processor 314, which can represent multiple processors, is connected to a communications bus 302. Display interface 316 forwards graphics data from the bus 302 for display on the display unit 318. This graphics data includes graphics data for the screen displays described herein.

Main memory 320 can be a random access memory (RAM), and can also include a secondary memory 322. In the disclosed embodiments the secondary memory 322 can include, for example, a hard disk drive 324 and/or a removable storage drive 326, representing a floppy disk drive, a magnetic tape drive, an optical disk drive, etc. The removable storage drive 326 reads from and/or writes to a removable storage unit 330 in a well known manner. Removable storage unit 330 represents a floppy disk, magnetic tape, optical disk, etc., which is read by and written to by removable storage drive 326. As will be appreciated, the removable storage unit 330 includes a computer usable storage medium having stored therein computer software and/or data.

In alternative embodiments, secondary memory 322 can include other similar means for allowing computer programs or other instructions to be loaded into computer system 301. Such means can include, for example, a removable storage unit 332 and an interface 328. In the disclosed embodiments, examples can also include a program cartridge and cartridge interface (such as that found in video game devices), a removable memory chip (such as an EPROM, or PROM) and associated socket, and other removable storage units 332 and interfaces 328 which allow software and data to be transferred from the removable storage unit 332 to computer system 301.

Graphical user interface module 334 transfers user inputs from peripheral devices 336 to bus 318. These peripheral devices 336 can be a mouse, keyboard, touch screen, microphone, video game controller, stylus, light pen, or any other type of peripheral unit. Peripheral devices 336 can include a graphics subsystem or engine. Here, the graphics subsystem can be implemented as one or more processor chips. In fact, the graphics subsystem can also be included as part of processor 314 as shown in FIG. 3. Graphics data is output from the graphics subsystem to the bus 302.

Computer system 301 can also include a communications interface 338. Communications interface 338 allows software and data to be transferred between computer system 301 and external devices via communications path 340. Examples of communications interface 338 that can be used with the disclosed embodiments include a standard or cable modem, a DSL connection, a network interface (such as an Ethernet card), a communications port, a LAN connection, a WAN connection, etc. Computer programs and data transferred via communications interface 338 are in the form of signals which can be electronic, electromagnetic, optical or other signals capable of being received by communications interface 338, via communications path 340. Note that communications interface 338 provides a means by which computer system 301 can interface to a network such as the Internet.

The disclosed embodiments can be implemented using computer programs (i.e., "software," or "computer control logic") running on Processor 314. The software can be originally stored as a "computer program product" on removable storage device 330 or hard disk drive 324. Therefore, computer program product refers to means for providing software to computer system 301.

Computer programs can also be stored in main memory 320 and/or secondary memory 322. Computer programs can also be received via communications interface 338. Such computer programs, when executed, enable the computer system 301 to perform the features of the disclosed embodiments as discussed herein. In particular, the computer programs, when executed, enable the processor 314 to perform the features of the disclosed embodiments.

In another embodiment, the disclosed embodiments are implemented primarily in firmware and/or hardware using, for example, hardware components such as application specific integrated circuits (ASICs). Implementation of a hardware state machine so as to perform the functions described herein will be apparent to persons skilled in the relevant arts.

In the example environment shown, communication interface 338 provides a two-way data communication coupling via a communications path 340 to a local network 348. For example, if communication interface 338 is an integrated services digital network (ISDN) card or a modem, communication interface 338 provides a data communication connection to the corresponding type of telephone line, which comprises part of communications path 340. If communication interface 338 is a local area network (LAN) card, or connects to a LAN 348, then it can provide a data communication connection via communications path 340 to a compatible LAN. Wireless links are also possible. In any such implementation, communication interface 338 sends and receives electrical, electromagnetic or optical signals which carry digital data streams representing various types of information.

Communications path 340 typically provides data communication through one or more networks to other data devices.

For example, in the disclosed embodiments communications path 340 can provide a connection through local network 348 to host computer 350 or to data equipment operated by an Internet Service Provider (ISP) 346. In turn, ISP 346 provides data communication services through the worldwide packet data communication network commonly called the "Internet" 344.

Local network 348 and Internet 344 both use electrical, electromagnetic or optical signals that carry digital data streams. The signals through the various networks and the signals on communications path 340 and through communication interface 338, which carry the digital data to and from computer 301, are exemplary forms of carrier waves transporting the information.

Computer system 301 can send messages and receive data, as well as computer programs, through the network or networks, communications path 340, and communication interface 338. If the network used is the Internet, server 342 can transmit a requested code for an application program through Internet 344, ISP 346, local network 348 and communications path 340. Examples of such applications are the application programs run by application servers and database servers, as described in detail below.

FIGS. 4-8 illustrate another set of embodiments of system 300, where system 300 is a node comprising a video game console or other console with intensive graphics rendering capability, including its ancillary and related components, features and functions. In particular, here exemplary node 102 is a video game console including: (i) the memory component 306 of FIG. 4, (ii) the communications component 308 of FIG. 5, (iii) the input/output component 310 of FIG. 6, (iv) the processor component 304 of FIG. 7, and (v) the graphics/sound component 312 of FIG. 8.

FIGS. 4-8 and the following discussion are intended to provide a brief, general description of a suitable computing environment in which the disclosed embodiments may be implemented. It should be noted that the disclosed embodiments may be implemented, for example, in a hardware device, or in computer-executable instructions organized in program modules, where the modules include the routines, programs, objects, components, and data structures that perform the tasks and implement the necessary data types.

Though system 300 is described as a node comprising a video game console or other console with intensive graphics rendering capability, the disclosed embodiments may be implemented in any other computer system configurations, including for example, hand-held devices, multiprocessor systems, microprocessor-based or programmable consumer electronics, minicomputers, mainframe computers, and the like.

The disclosed embodiment may also be used in distributed computing environments where tasks are performed by remote processing devices that are linked through a communications network, where the program modules may be located in both local and remote memory storage devices.

Accordingly, in one or more embodiments, system 300 is a node 102-108 comprising a video game console. As an example, system 300 may comprise a personal computer (PC) based video game, or a specially suited video console. One example of a specially suited video console is Playstation 2™, manufactured by Sony Computer Entertainment Inc. Another example of a specially suited video console is Xbox™, manufactured by Microsoft Corporation. Skilled persons will realize that the foregoing video game consoles are presented by way of illustration, and that the present embodiments are not limited to the foregoing video game consoles, but may instead include any type of video game consoles.

Figure 4:
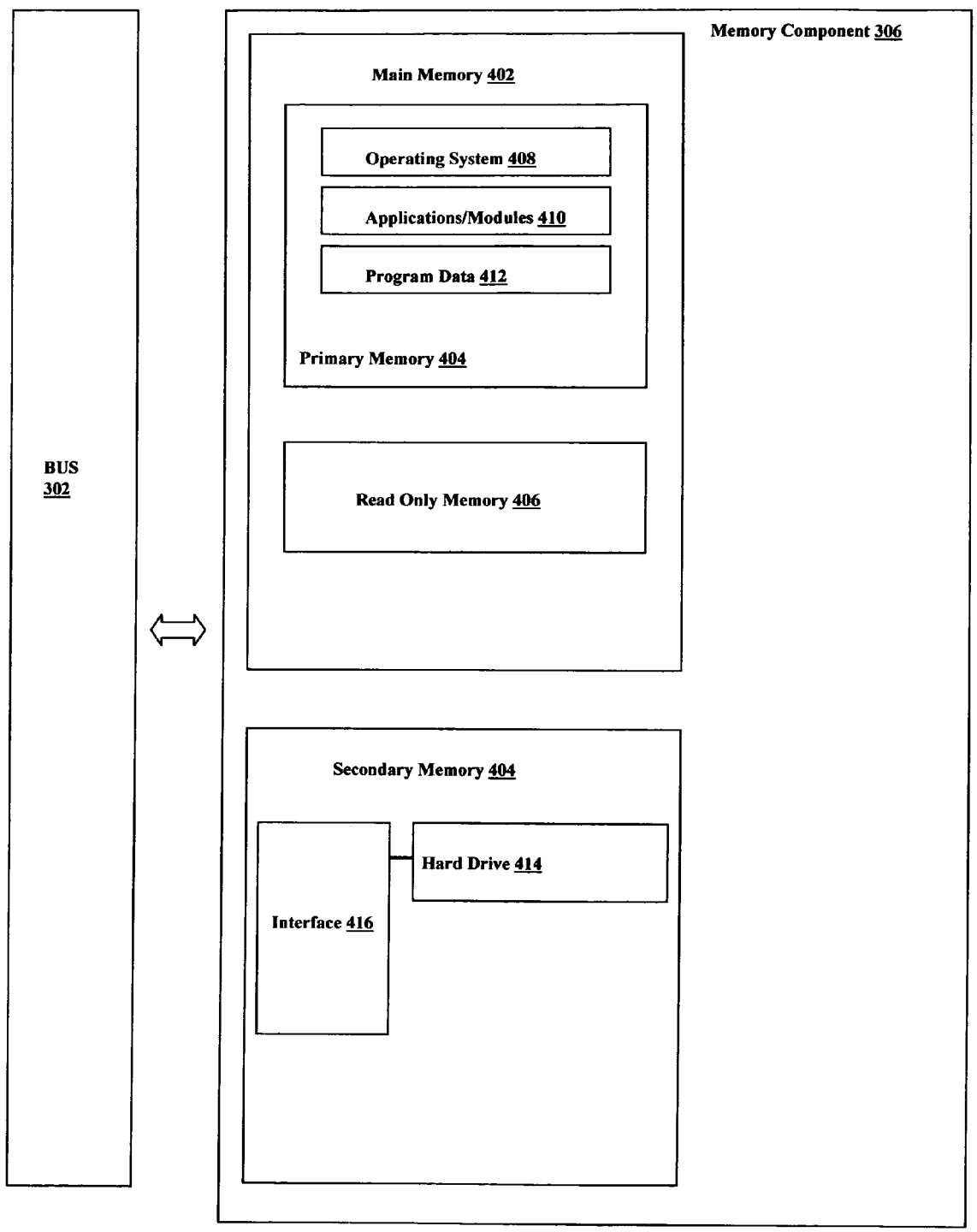
FIG. 4 illustrates a block diagram view of an exemplary memory component of an exemplary virtual processing system comprising the system of FIG. 3A.

Beginning with FIG. 4, memory component 306 of system 300 includes a main memory 402 and a secondary memory 404 connected to bus 302. Main memory 402 includes a primary memory 404 and a read only memory 406. Primary memory 404 is illustrated to store an operating system 408, an applications/modules component 410, and a data component 412. Secondary memory 404 includes a hard drive 414 and an interface 416 from hard drive 414 to system bus 302.

Bus 302 may comprise any type of computer bus structure. Examples include a memory bus or memory controller, a peripheral bus, and a local bus using a bus architecture such as PCI, VESA, Microchannel (MCA), ISA and EISA. Memory component 306 includes read only memory (ROM) 406 and main memory (for example, a random access memory (RAM)) 402. ROM 406 stores a basic input/output system (BIOS), which contains the basic routines that help to transfer information between elements within system 300, such as during start-up of system 300. Main memory 402 may store an operating system 408, one or more application programs and modules 410, and program data 412.

In one or more embodiments hard drive 414 of secondary memory 404 may also store operating system 408, application programs and modules 410, and program data 412 (not shown). Hard drive 414 is interfaced with bus 302 via hard drive interface 416.

Figure 5:
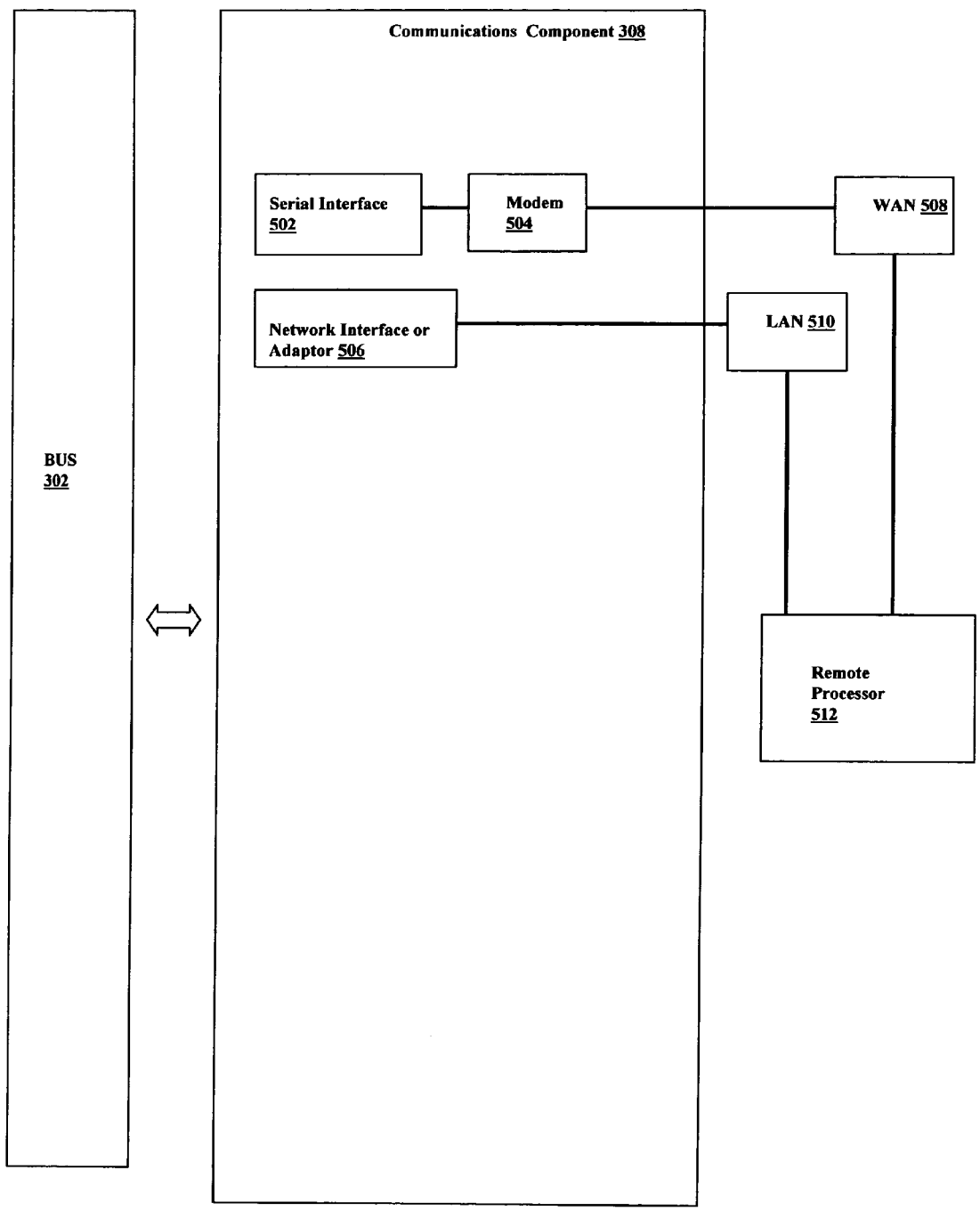
FIG. 5 illustrates a block diagram view of an exemplary communications component of an exemplary virtual processing system comprising the system of FIG. 3A.

FIG. 5 illustrates communications component 308 of system 300. Communications component 308 includes serial interface 502, modem 504 and network interface or adaptor 506. Also illustrated are wide area network (WAN) 508, local area network (LAN) 510, and remote processors 512. The network connections illustrated are merely for exemplary purposes, and many different types of communications connections may alternatively be provided with respect to system 300.

System 300 may operate in a networked environment using logical connections to one or more remote processors, such as a remote processor 512. Remote processor 512 may be a server, a router, a peer device or other common network node, and may include many or all of the elements described relative to system 300. The logical connections include the illustrated LAN 510 connection and WAN 508 connection.

When used in a LAN networking environment, system 300 is connected to the LAN 510 through a network interface or adapter 506. When used in a WAN networking environment, system 300 may include a modem 504 or other devices for establishing communications over WAN 508, such as the Internet. Modem 504 may be internal or external to system 300. Modem 504 is connected to bus 302 via a serial interface 502. In a networked environment, one or more memories associated with remote processor 512 may store program modules relative to system 300 (or portions thereof).

Figure 6:
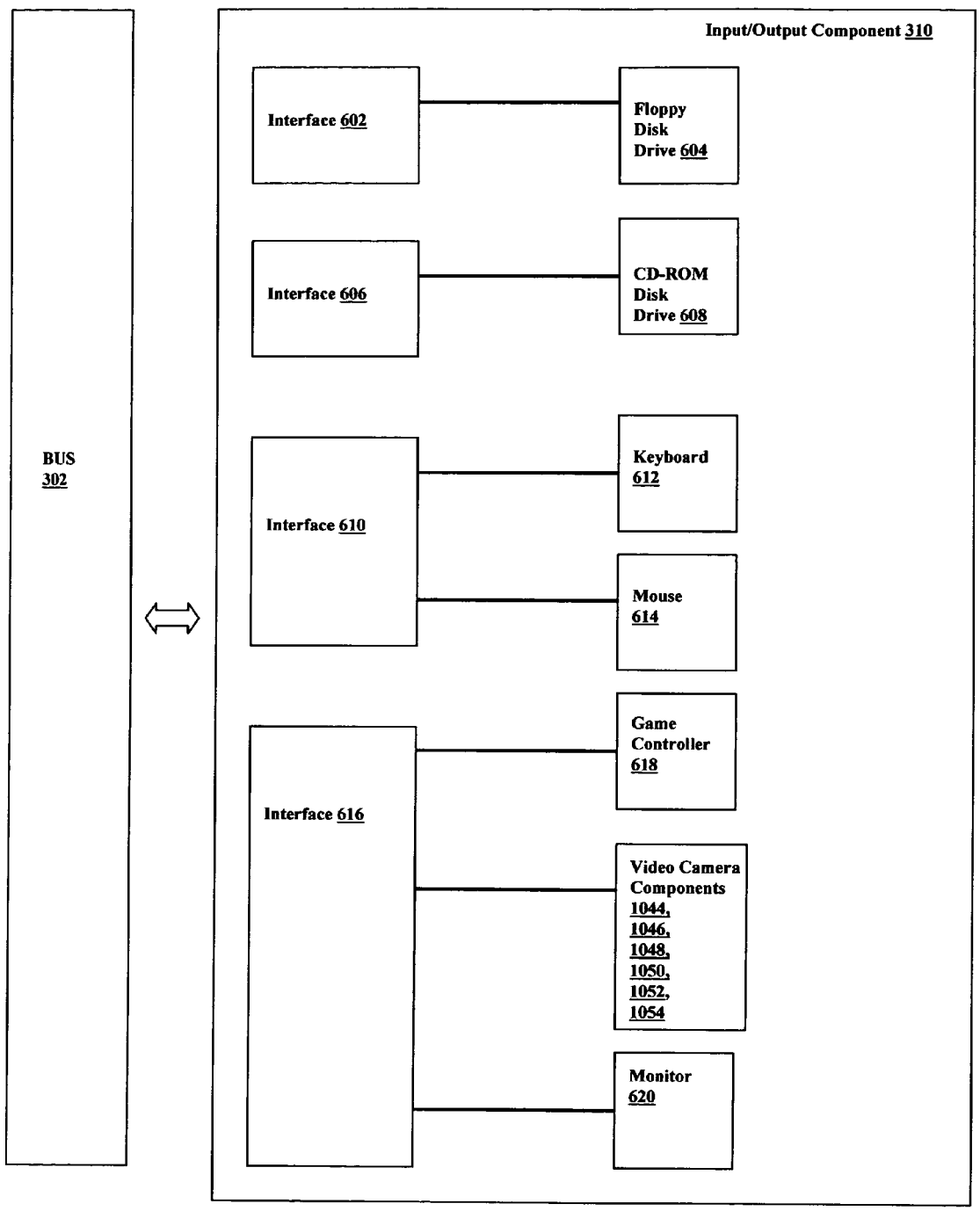
FIG. 6 illustrates a block diagram view of an exemplary input/output component of an exemplary virtual processing system comprising the system of FIG. 3A.

FIG. 6 illustrates input/output component 310 of system 300. Input/output component 310 includes floppy disk drive 604, CD-ROM disk drive 608, keyboard 612, mouse 614, game controller 618, video camera components 1044, 1046, 1048, 1050, 1052, 1054 (see FIG. 10), monitor 620, and respective interfaces 602, 606, 610 and 616 for the foregoing. It should be noted that hard drive 414 and its interface 416 to bus 302 (FIG. 4) may optionally be included in input/output component 310, though not shown here.

As shown, system 300 includes a floppy or other magnetic disk drive 604, to read from or write to a removable disk, and a CD-ROM or other optical disk drive 608, to read from or write to other optical media. The floppy drive 604 and CD- ROM drive 608 are respectively connected to system bus 302 by exemplary magnetic disk drive interface 602 and optical disk drive interface 606. In one embodiment, computer-readable media placed in the respective drives provide nonvolatile storage of data and computer-executable instructions, including program code comprising executable files and linking libraries. It should be noted that other media readable by system 300 may also be included, including flash memory cards, digital video disks, and magnetic cassettes.

The user of system 300 may enter commands and information into the system through a keyboard 612 and a pointing device, such as mouse 614. Other input devices include a game controller 618 and its components, such as a video game controller, a game pad, and one or more video camera component 1044-1052, whose features and functions are described in detail below in reference to FIG. 10. Additional input devices (not shown) may include microphones, satellite dishes and scanners. The foregoing and other input devices may be connected to processor component 304 through interfaces 610, 616 coupled to system bus 302. Exemplary interfaces include a serial port interface, a parallel port interface, a game port interface, and a universal serial bus (USB) interface.

Monitor 620 or any other type of device is connected to system bus 302 via exemplary interface 616, which in this case may be display controller or video adapter. Other types of peripheral output devices that are not shown include speakers, printers and fax machines.

Figure 7:
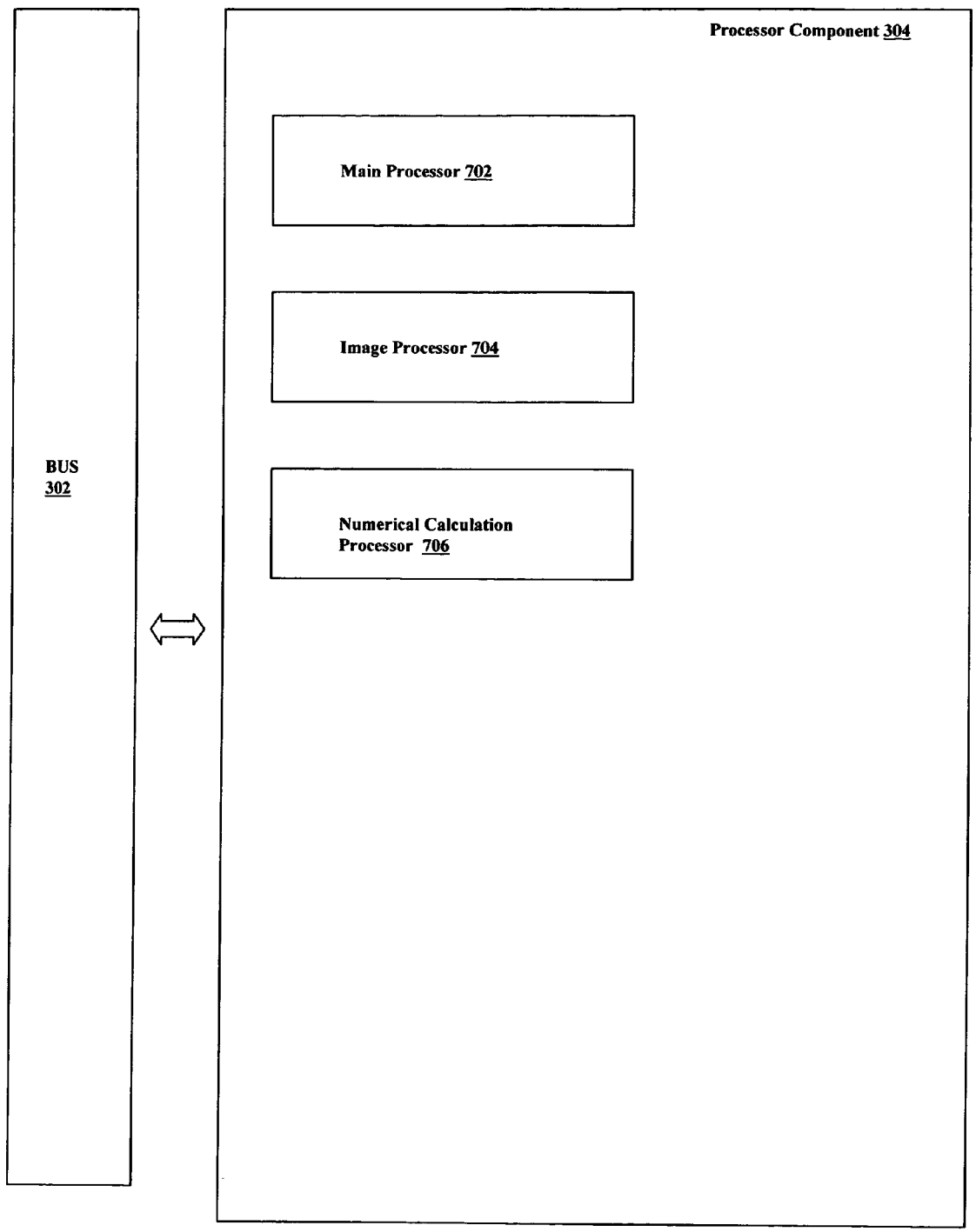
FIG. 7 illustrates a block diagram view of an exemplary processor component of an exemplary virtual processing system comprising the system of FIG. 3A.

FIG. 7 illustrates processor component 304 of system 300. Processor component 304 includes main processor 702, image processor 704 and numerical calculation processor 706. Main processor 702 interacts with memory component 306 over system bus 302 to control the overall system operations. Image processor 704 generates data based on controls from main processor 702 and outputs video signals to monitor 620 of input/output component 310, via system bus 302 and interface 616. Numerical calculation processor 706 performs floating point calculations and the like for processing of geometrical shapes and other data corresponding to graphical objects.

Figure 8:
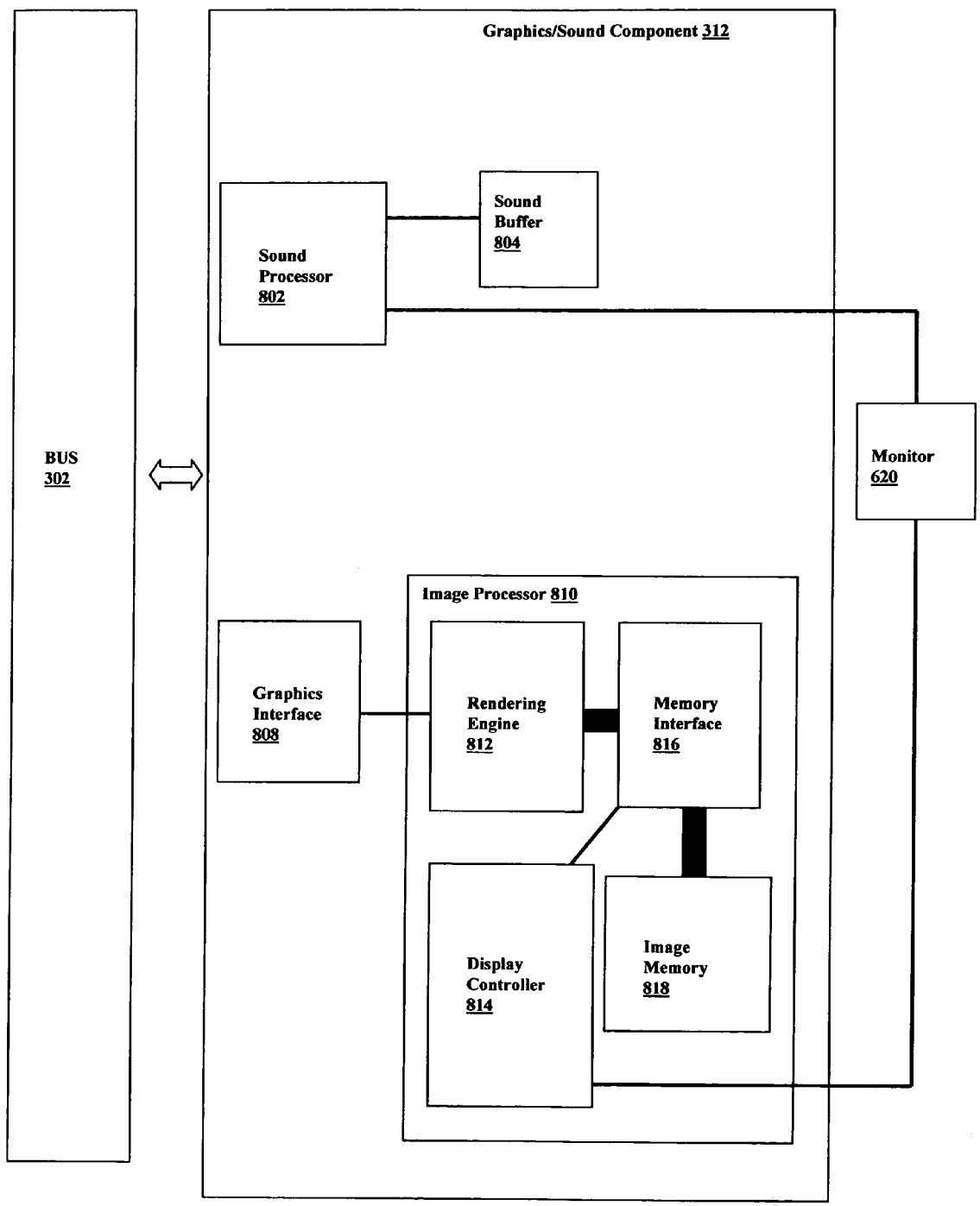
FIG. 8 illustrates a block diagram view of an exemplary graphics/sound component of an exemplary virtual processing system comprising the system of FIG. 3A.

FIG. 8 illustrates graphics/sound component 312 of system 300. Graphics/sound component 312 includes sound processing unit 802, sound buffer 804, graphics interface 808, and image processor 810. Image processor 810 includes rendering engine 812, memory interface 816, display controller 814 and image memory 818.

FIG. 8 also shows monitor 620 connected to sound processor 802 and display controller 814. As noted, the actual connection to monitor 620, which is a subcomponent of input/output component 310, is via system bus 302, and for example, a sound interface (which is not shown) for sound processor 802, for sound data, and for example, graphics interface 808 for image processor 810, for image data.

Sound processor 802 generates music and other sound effects based on instructions from main processor 702 over system bus 302. Sound buffer 804 is used by sound processor 802 to record waveform data. The output of sound processor 802 may be directed to an output device in the input/output component 310 via system bus 302, such as a speaker (not shown) or monitor 620.

Graphics interface 808 is an interface for translation over system bus 302 between main processor 702 and image processor 810, or for translation over system bus 302 between numerical calculation processor 706 and image processor 810.

Image processor 810 includes a rendering engine 812, a memory interface 816, a display controller 814 and an image memory 816. Display controller 814 may be, for example, a programmable CRT controller. Image memory 818 may, for example, use a unified memory structure where a texture rendering region and a display rendering region are set in a uniform area. Rendering engine 812 executes operations for rendering of predetermined graphical image data in image memory 818 through memory interface 816. These operations are executed in relation to and in correspondence with rendering commands supplied from main processor 702 of processor component 304 over system bus 302.

In one embodiment, memory interface 816 and rendering engine 812 are connected over a first bus, and memory interface 816 and image memory 818 are connected over a second bus. The bit width of the aforementioned buses increases as the graphical rendering technology develops, and includes, as one example, a bit width of 128 bits for high speed rendering by rendering engine 812. In one embodiment, for example, rendering engine 170 is capable of real-time rendering of image data respectively of 320×240 pixels or 640×480 pixels, conforming to, for example, NTSC or PAL standards. For example, the rendering rate may be several tens of times per one sixtieth of a second interval (or one thirtieth of a second interval).

V. Client-Server Environment; Internet

In one embodiment, the aforementioned nodes 102-108, processors 110, and processes 112, 114 running on the processors, are described by virtue of their functions with respect to information retrieval within a network.

Specifically, a node that requests information is termed a "client" and a node that transmits the requested information is termed a "server." A node can have thee dual roles of serving as both a client as well as a server.

The processes running on the clients are termed client applications, and the processes running on a server are termed server applications. Information exchange occurs between the server application providing the information or services, and the client application receiving the provided information and services.

Figure 9:
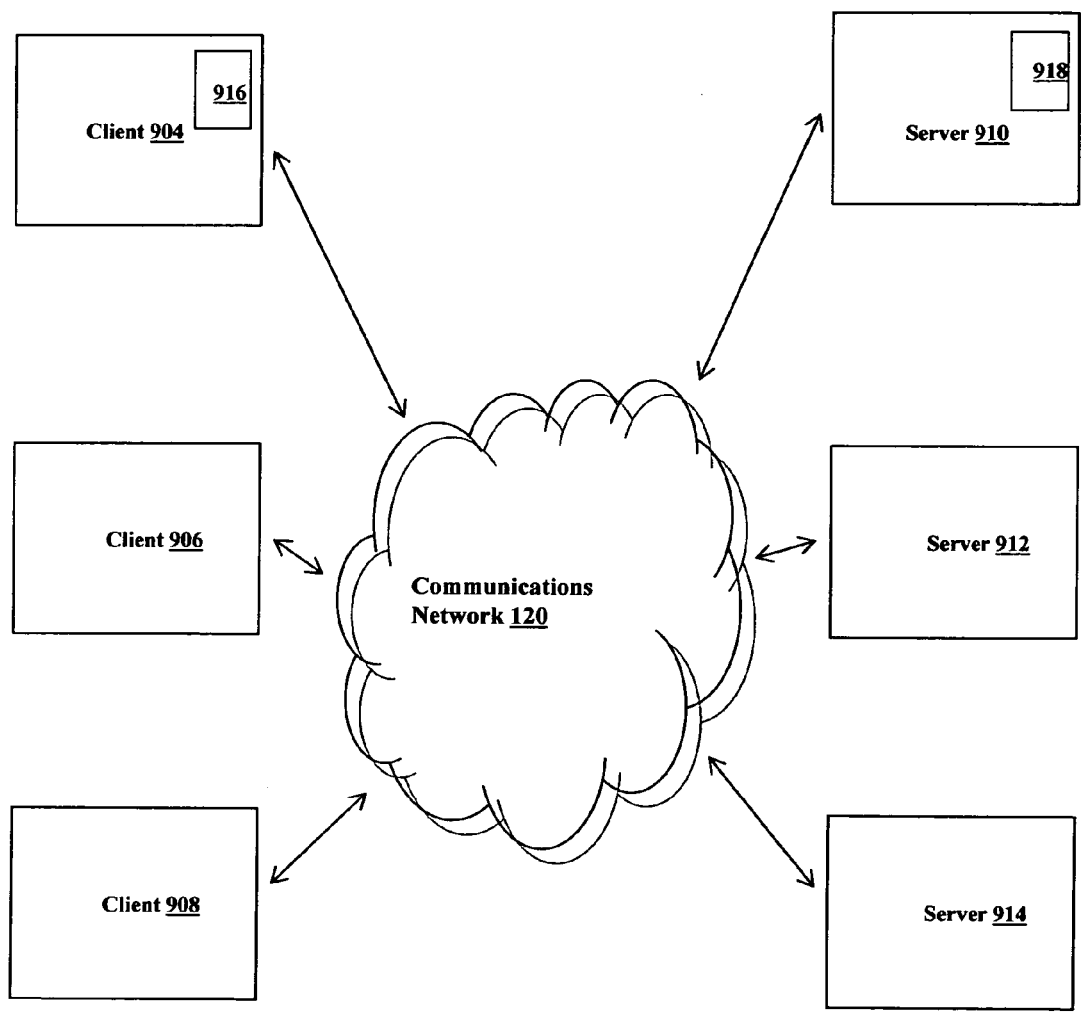
FIG. 9 illustrates an exemplary client-server environment for the system of FIGS. 1-9.

FIG. 9 illustrates an exemplary client-server environment 900. Client-server environment 900 includes the aforementioned communications network 120, which can be a national or an international network. It also includes a number of clients 904, 906, 908, and a number of servers 910, 912, 914. The clients 904-908 and the servers 910-914 are nodes connected to network 120, defined by their respective information retrieval functions.

Client 904 includes a client application 916, which is an information requesting or receiving application associated with client 904. Client application 916 either runs directly on client 904 or is remotely accessible from client 904.

Server 910 includes a server application 918, which is an information retrieval application associated with server 910. Server application 918 either runs directly on server 910 or is remotely accessible from server 910.

In an exemplary operation, client application 916 is executed on client 904. In response, client 904 issues a request for information transmitted over network 120. The request is received by server 910, which executes server application 918. The requested information and/or services are then transmitted back to client 904 over network 120.

As noted, network 120 can be any type of network, either private or public. In one or more embodiments, environment 300 (including network 120) refers to the Internet and World Wide Web (Web). In these embodiments, clients and servers transmit information in formats and media acceptable to the Internet and Web.

Internet refers to a worldwide system of interconnected computer networks that use the Transmission Control Protocol/Internet Protocol (TCP/IP) set of protocols. TCP/IP, in turn, typically refers to a bundle of network protocols, including: (i) the IP, a network layer protocol where unique IP addresses identify each network and each of its hosts, (ii) TCP, a connection-oriented protocol, where a connection is established via handshakes before any data is transmitted and (iii) certain application layer protocols, including telnet and file transfer protocol (FTP).

The parts of the Internet that are most widely used are electronic mail (e-mail) and the aforementioned Web. The Web is a network of computers located all over the world. These international computer networks can be comprised of clients and servers that users access to locate resources.

In one embodiment, all the clients 304-308 and servers 310-314 in the Web can communicate with each other, and normally use a communication standard called Hypertext Transfer Protocol (HTTP). HTTP is an application protocol, i.e. a set of rules, for exchanging files on the Web that runs on top of TCP/IP.

The information on the Web is stored in documents called Web pages, which are files stored on the servers 310-314 comprising the Web. The clients 304-308 request the Web pages from the servers 310-314 (specifically server applications 318 running on the servers 310-314). More specifically, client applications 316 running on the clients 304-308 request the Web pages from server applications 318 running on the servers 310-314.

In the present embodiment, the client applications 316 are typically called Web browsers. Examples of well known browsers 316 that can be used with the disclosed embodiments include Spry's Mosaic, Microsoft's Internet Explorer, and Netscape's Navigator. Browsers 316 are capable of understanding a variety of program languages used to design the Web pages, as well as protocols used to transmit the Web pages.

Web browsers 316 have varying levels of sophistication and functionality. Each screenful of information includes such items as highlighted words, graphics, menu choices, through which users can hyperlink (or "link") to retrieve further information, either from the client 304-308 itself (for local files) or from servers 310-314 located on the Web. Table 2 contains common Internet terms known to skilled persons.

The manner of displaying the retrieved informational content in a web browser 316 is primarily according to formatting and display languages. Examples of formatting and display languages that can be used with the disclosed embodiments include Hyper Text Markup Language (HTML), eXtensible Markup Language (XML), EXtensible HyperText Markup Language (XHTML), and Cascading Style Sheets (CSS).

HTML is used to create text files that contain markup tags, which inform the browser how to display the page. HTML files must have an "htm" or "html" file extension, and can be created using a simple text editor. XML is a markup language, permitting users to define their own markup tags. The markup tags in XML are not predefined as with HTML. XML uses a Document Type Definition (DTD) or an XML Schema to describe the data. While HTML was designed to display data, focusing on how the data appears, looks, XML was designed to describe data, focusing on the data itself, providing the ability to structure, store, and to send information. XML is pared-down version of Standard Generalized Markup Language (SGML), specifically designed for Web documents. SGML is a comprehensive system for the organization and tagging of document elements. Rather than specifying particular formatting, SGML specifies the rules for tagging elements. XHTML is the same as a version of HTML referenced as HTML 4.01. It is HTML defined as an XML application and applies a strictly defined version of HTML. CSS is used to design stylesheet pages, which define how the document is displayed or printed to the browser. CSS sheets can be attached to the HTML document itself. The cascading feature supported by CSS permits a single document to use two or more stylesheets, which are applied according to specified priorities.

The manner of formatting the information for retrieval from servers 310-314 and transmitting the retrieved information over network 120 are determined by protocols. A variety of protocols can be used to implement the disclosed embodiments over the Internet, including the aforementioned HTTP, FTP, telnet, as well as, for example, Internet Relay Chat (IRC).

The main protocol (or set of rules for navigation and exchanging of files between clients and servers) used on the Web is HTTP, designed for exchanging files running on top of TCP/IP. HTTP not only defines how messages are formatted and transmitted, but also what actions Web server applications 318 and browsers 316 should take in response to various commands.

The act of using a client browser 316 to download a Web page located at a server application 318 can also be called navigating the Web, or browsing the Web, or linking to Web sites on the Web. Each Web page has a Web address called a Uniform Resource Locators (URLs). Consequently, Web pages are located by linking to the URL of a Web page and displaying it in the browser 316. Users can link to Web pages by selecting or clicking on menu choices, highlighted words, or graphics associated with URLs. When a user enters a URL in his/her browser, or otherwise attempts to link to a website, it causes an HTTP command to be sent to the appropriate Web server, directing it to fetch and transmit the requested Web page.

VI. Exemplary Embodiments

In the remainder of the description portion of the specification, the technology discussed in the foregoing sections is applied to a specific type of environment. The embodiments are described with respect to generating, reviewing, processing, storing, retrieving, analyzing, and optimizing information input to or output from a virtual environment. In particular, the embodiments are described with respect to generating, reviewing, processing, storing, retrieving, analyzing, and optimizing information in the form of image snapshots and videos within a virtual environment, though the described embodiments are not limited merely to extracting image snapshots and videos, but can be used for any input or output of information to or from a virtual environment.

The particular type of virtual environment is not limited to the described embodiments, but can apply to any virtual type of environment, including for example (i) a virtual reality system, (ii) an augmented reality system, (iii) a video game system, and (iv) a virtual movie, including (v) systems augmented with or based upon real-world input/output and artificial intelligence (AI) or its derivatives. For example, the disclosed embodiments can be used to extract, process and store delayed-time or real-time inputs to and outputs from video film taken from within an individual's body, in order to extract virtual video from different perspectives for diagnostic testing, and to provide output to laser surgical apparatus for surgery.

Additional embodiments include (i) digital filmmaking, (ii) simulations of military equipment and personnel readiness during war games, (iii) flight simulation training for pilots, (iv) modeling simulations for biological, chemical and molecular analyses, (v) simulations related to graphical rendering of building facilities for architects, builders, and governmental registration authorities, and (vi) any other simulations that may be contemplated.

Figure 10:
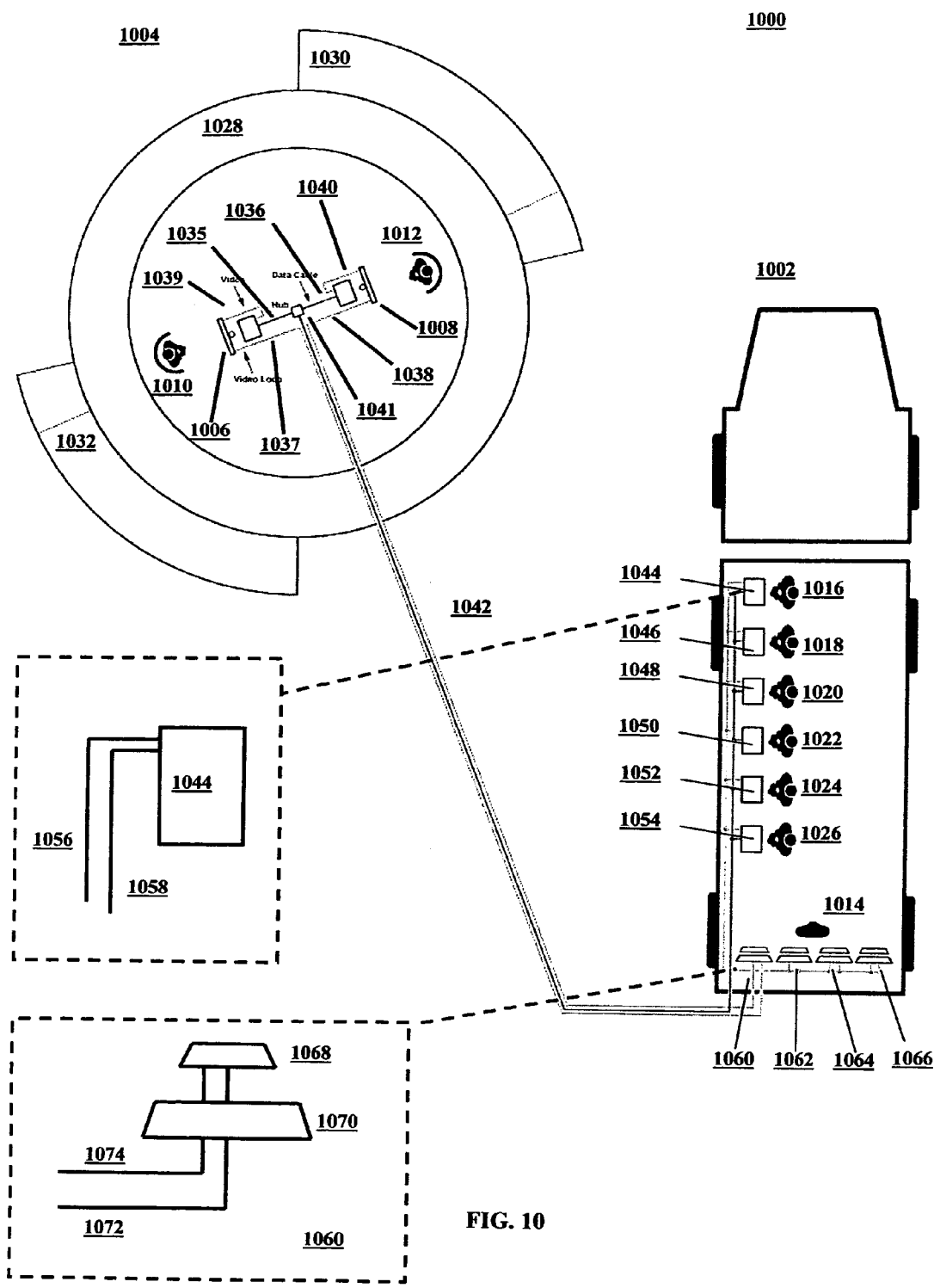
FIG. 10 illustrates a representative view of an exemplary environment for the disclosed embodiments including a Gamecaster Cybercam™ facility and a virtual system area.

FIG. 10 is an embodiment relating to professional filming of video game competitions employed by Gamecaster™ of San Diego, Calif. Environment 1000 of FIG. 10 includes two main components, namely the Gamecaster Cybercam™ facility 1002 of Gamecaster™ and a video gaming arena 1004.

Beginning with arena 1004, two video game players 1010, 1012 play a real-time or delayed-time video game together, respectively using consoles 1006, 1008 for submitting their video game input commands and monitoring their activities from a perspective within the video game. As used herein, consoles 1006, 1008 may refer to consoles, as the term is used in the applicable technology, or any type of computer generated virtual environment and the like, which may also be processed and/or stored remotely from the physical devices 1006, 1008. Arena 1004 includes a circular field of play 1028, with video game fans and enthusiasts seated at seating sections 1030, 1032 to watch both the players 1006, 1008 in real-life as they play, and to watch the game competition on a large screen display above their heads (not shown).

Consoles 1006, 1008 (i) permit video game players 1010, 1012 to employ any known or thought of methods for inputting their commands, such as, for example, via a video game controller, an optical device, and the like, and (ii) permit video game players 1010, 1012 to review their gaming activities from within the game employing any known or thought of methods, such as two dimensional or three dimensional flat screen displays, three dimensional holographic images, and the like, in the manner of one or more perspectives from within the video game. It should be noted that the functions associated with consoles 1006, 1008 may also be performed remotely by remote processing hardware, software, firmware, and the like.

In one embodiment, the video game is executed by one or more of the video console 1006, 1008 processors. Here, for example, the views of the video game players 1010, 1012 from within the video game, as chosen by the video game players, are transmitted from processors of video consoles 1006, 1008 over video connections 1039, 1040 to monitors of the video consoles 1006, 1008. In another embodiment, the video game is executed by one or more processors located remotely from the video game consoles 1006, 1008. Here, for example, the views of the video game players 1010, 1012 from within the video game, as chosen by the video game players, are transmitted from such remote processors over video connections 1039, 1040 to monitors of the video consoles 1006, 1008. In one or more described embodiments, the connections described herein refer to data connections over a wireline, or wireless, or combined wireline and wireless connections.

The aforementioned perspectives chosen by the video game players 1010, 1012, are also transmitted over data lines 1035, 1036 from the console video game displays to an Ethernet data hub 1041 for distribution over data line 1042. In one embodiment, hub 1041 provides data access to the video game by providing one or more data connections to the one or more processors running the video game. Accordingly, data line 1042 may provide access to and from the video game that is running through hub 1041.

In one or more embodiments, each video console 1006, 1008 comprises a node 102-108 (FIG. 1), having processes 112, 114, located resident on the node or remotely accessible by the node, executed on one or more processors 110, located resident on the node or remotely accessible by the node, for such functions as executing the video game, receiving inputs from video game players 1010, 1012, and transmitting outputted video images from within the video game being executed. In one embodiment where the video game is executed remotely from video consoles 1006, 1008, the video game is run on another node 102-108, in the form of processes 112, 114, located resident on the node or remotely accessible by it, and executed on one or more processors 110, located resident on the node or remotely accessible by it. Accordingly, the aforementioned input, output, and processing related components can have any alternative structures and functions described herein with reference to nodes 102-108, including their processors 110, and their respective processes 112, 114.

In addition, in one or more embodiments, the data connections 1035, 1036, 1037, 1038, 1042 and associated processing units, including hub 1041, and telecommunications processing systems (including instructional hardware, software, and/or firmware running on video consoles 1006, 1008, or remotely from them) comprise communications network 120. Accordingly, the aforementioned communications related components can have any alternative structures and functions described herein with reference to communications network 120. As one example, video game players 1010, 1012 and their respective video consoles 1006, 1008 can be located remotely from one another and respectively remotely located from a third node where the video game is being executed, with the inputs and outputs respectively submitted and received over data connections over a data network (for example, the Internet) comprising communications network 120.

For example, (i) the video game can be executed on video consoles 1006, 1008, or executed remotely from them, such as through an Internet or other data connection, through a communications network 120, (ii) the view perspectives from within the video game being monitored on consoles 1006, 1008 respectively by video game players 1010, 1012, can be output from either a local video game being executed on video consoles 1006, 1008, or output from the aforementioned remotely executed video game, and (iii) the input of video game commands by video game players 1010, 1012 respectively to consoles 1006, 1008, can be input to either a local video game being executed on video consoles 1006, 1008, or input to the aforementioned remotely executed video game.

As noted, the second main component of environment 1000 is Gamecaster Cybercam facility 1002. As illustrated, Gamecaster Cybercam™ facility 1002 is a truck facility, though Gamecaster Cybercam™ facility 1002 can be any type of facility known.

Gamecaster Cybercam™ facility 1002 includes one or more camera persons 1016, 1018, 1020, 1022, 1024, 1026, respectively having access to video camera components 1044, 1046, 1048, 1050, 1052, 1054.

Video camera components 1044-1054 respectively permit camera persons 1016-1026, to view the video game being played according to the respective desires of camera persons 1016-1026 and the operational parameters of video camera components 1044-1054, whose features and functions are described in greater detail below.

Each camera person 1016-1026 can preset or set in real-time his or her respective video camera component 1044-1054 to display one or more perspective views from within the video game. The perspective views can be set in accordance with the working functions of the video game processing system, such as for example, set through the spectator mode of a video game executing in main processor 702 (of processor component 304 shown in FIG. 7), possibly in combination with image processor 810 (of graphics/sound component 312 shown in FIG. 8), according to instructional commands sent from the video camera components 1044-1054 to the video game via interface 616 (shown in FIG. 6).

Alternatively, in another embodiment the perspective views of video camera components 1044-1054 can also be set in accordance with programs and/or executable code passed to the video game processor 702 (of processor component 304 shown in FIG. 7), possibly in combination with image processor 810 (of graphics/sound component 312 shown in FIG. 8), such as by way of applets, causing views according to parameters desired by the camera persons 1016-1026 and according to the operational parameters of video camera components 1044-1054.

As shown with respect to exemplary video camera component 1044, data and instructions can be sent from or received to the processors executing the video game, by way of data line 1058 connected to data line 1042. Accordingly, (i) video camera components 1044-1054 are operated by camera persons 1016-1026 to transmit commands to the processor running the video game to change the view monitored by camera persons 1016-1026 on video camera components 1044-1054; and (ii) based on commands transmitted back from the processor executing the video game over lines 1042, 1058, the desired changed view is shown to camera persons 1016-1026 by the monitor components of video camera components 1044-1054.

Referring back to Gamecaster Cybercam™ facility 1002, in one or more embodiments, any display views of the video camera components can be transmitted over data line 1056 to video consoles 1060, 1062, 1064, 1066. One or more directors 1014 respectively have access to, and may control operations, with respect to video consoles 1060-1066.

Video consoles 1060-1066 respectively include displays associated with respective processing units, as for example display 1068 associated with processor 1070 of video console 1060. In addition, however, the processing capability of video consoles 1060-1066 may be located remotely and remotely accessible from video consoles 1060-1066.

Video consoles 1060-1066 enable director 1014 to monitor any of the perspective views from within the video game received from video consoles 1044-1054. As noted, the data from video consoles 1044-1054 operated by camera persons 1016-1026 are transmitted to the director's video consoles 1060-1066 via data line 1056.

In one or more embodiments, an exemplary video console 1060 also enables director 1014 to remotely monitor one or more unique views from within the video game. The foregoing may be performed passively, as for example, where video console 1060 is set, whether in delayed-time or in real-time, to one or more perspective views from within the video game. For example, the data and associated commands from the video game being executed are received from data line 1042 by data line 1074 connected to video console 1060.

Instead of a passive viewing of the video game, director 1014 can also (i) employ his or her own video camera component (not shown), or (ii) may operate a live broadcast switch to switch between the different views offered by video camera components 1044-1054. Here, the director's device is preset or set in real-time to display one or more perspective views from within the video game. The perspective views can be set in accordance with the working functions of the video game, such as for example, set through the spectator mode of the video game, according to instructional commands sent from the video camera component to the video game. Alternatively, the perspective views of the video camera components can also be set in accordance with programs and/or executable code passed to the video game, such as by way of applets, causing views according to parameters desired by the director operating the video camera component. Here, the data and associated commands are transmitted to data line 1042, and received from data line 1042, respectively by way of data lines 1072, 1074 connected to video console 1060. The foregoing applies where, for example, the video console is a video camera component. Unlike a real-world sports event, the actions of the video game players 1010, 1012 within an executed video game may be recorded for playback. This permits the director 1014 to run a prerecorded video game, and switch between the camera shots of video game components 1044-1052. Accordingly, though not possible in real-world sports events, the disclosed embodiments permit director 1014 to replay the prerecorded video game over and over, establishing unique camera shots in each replay.

In one or more embodiments, one or more of the video consoles 1060 employed by director 1014 are used to transmit their resident (or remotely accessible) video images to a remote display. For example, the remote display can be a very large video display apparatus located above the center of arena 1004, for display by fans and enthusiasts seated in seats 1030, 1032. Here, the image displayed on monitor 1068 of video console 1060 is transmitted as data over data lines 1072, 1042 to hub 1041, where the data signal is transmitted to the video display apparatus. As another example, the image data is transmitted as a video broadcast feed and displayed over, for example, network television, cable television, or an Internet webcast.

In one or more embodiments, one or more of the video consoles 1060 employed by director 1014 have processors, located resident to the video console 1060, or remotely accessible by the video console 1060, to permit director 1014 to switch between the perspective views from within the video game as shown on monitor 1068 of video game console 1060. In particular, video game console 1060 can be used to switch between any of the videos received from video consoles 1044-1054, the videos reviewed by the director's own video consoles 1060-1066, as well as the videos viewed by video game players 1010, 1012.

In one or more embodiments, each video camera component 1044-1054, and video console 1060-1066 comprises a node 102-108, having processes 112, 114, located resident on the nodes or remotely accessible by the nodes, executed on one or more processors 110, located resident on the nodes or remotely accessible by the nodes, for such functions as transmitting and receiving commands related to a view from within the video game. Accordingly, the aforementioned video camera components 1044-1054, and video consoles 1060-1066, can have any alternative structures and functions described herein with reference to nodes 102-108, their processors 110, and their processes 112, 114.

In addition, in one or more embodiments, the data connections 1056, 1058, 1072, 1074, and associated processing units, including telecommunications processing systems (including instructional hardware, software, and/or firmware running on video camera components 1044-1054 and video consoles 1060-1066, or remotely from them) comprise communications network 120. Accordingly, the aforementioned communications related components can have any alternative structures and functions described herein with reference to communications network 120. As one example, any of the parties (i) video game players 1010, 1012 and their respective consoles 1006, 1008, (ii) the additional node (if any) from which the game is being executed, (iii) the location of any one of camera persons 1016-1026, and/or any video camera component 1044-1055, and (iv) the location of any one of directors 1014 and/or any video console 1060-1066, can be respectively remotely located from one another and can exchange data respectively between one another over data connections over a data network (for example, the Internet) comprising communications network 120.

Figure 11A:
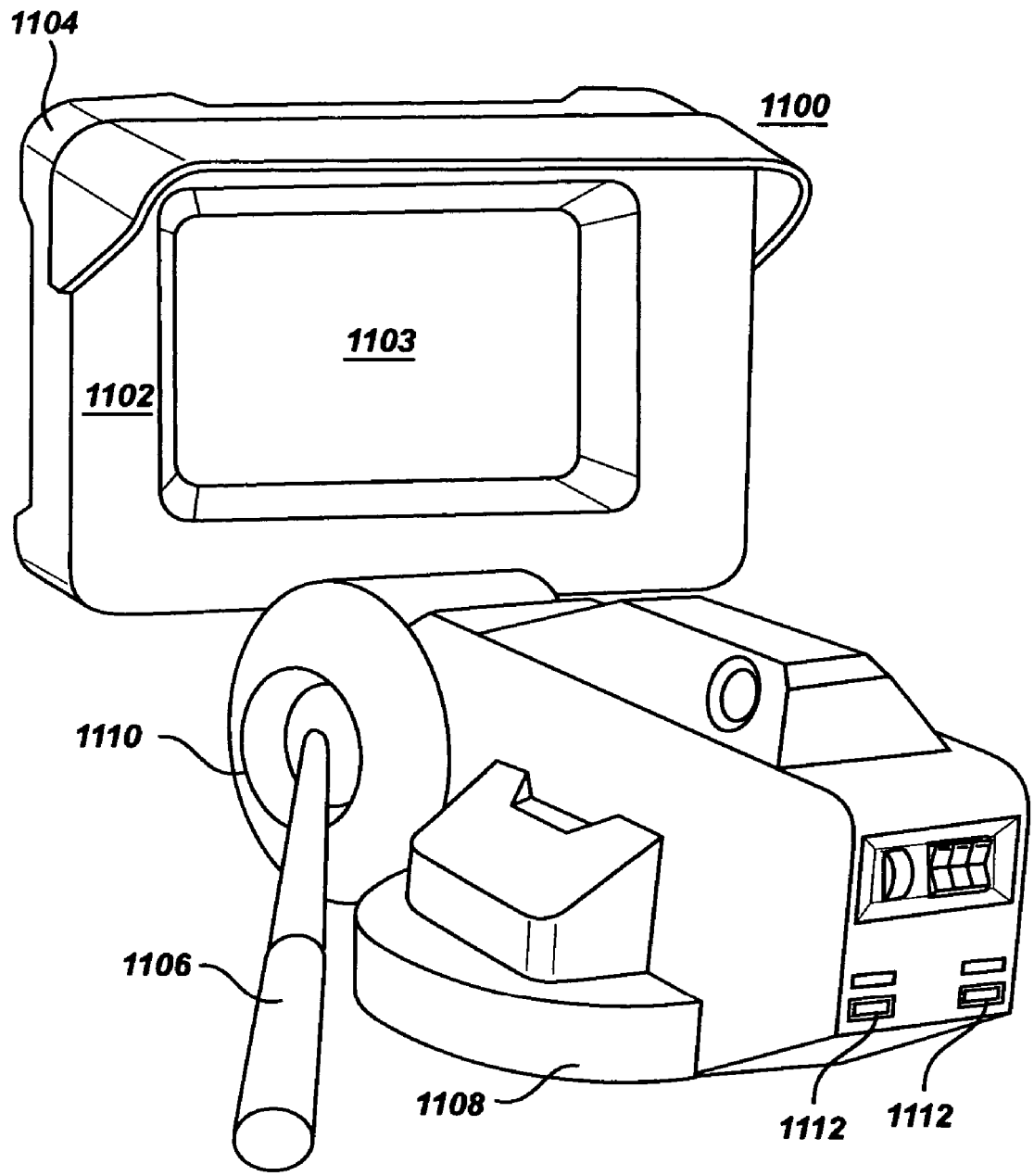
FIGS. 11A, 11B respectively illustrate perspective views of a model of an exemplary video camera component described in the disclosed embodiments.
Figure 11B:
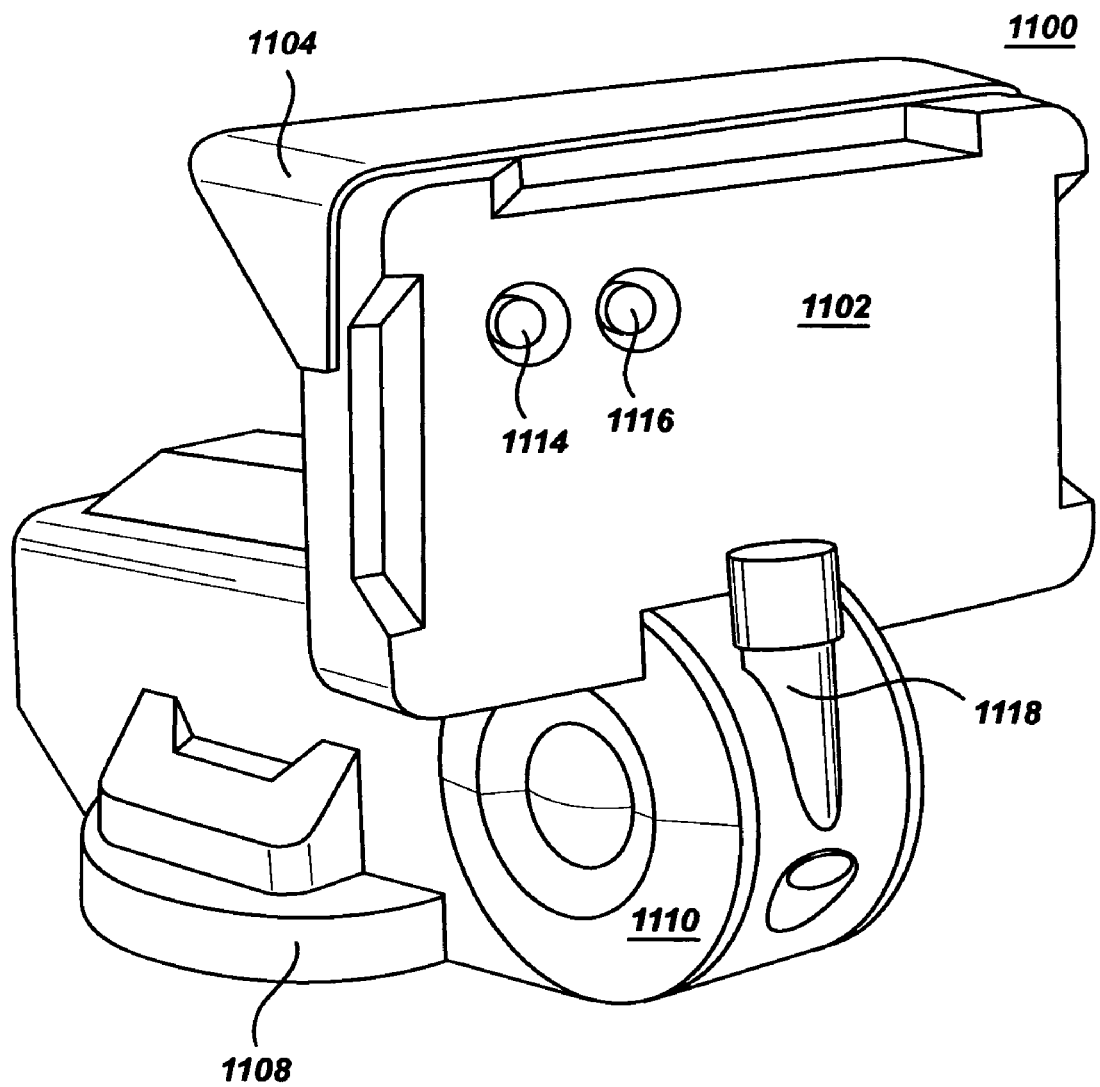

FIGS. 11A, 11B respectively illustrate perspective views of a model 1100 of an exemplary video camera component 1044-1054 described in the disclosed embodiments. In one or more embodiments, model 1100 represents a node 102-108 functioning within a communications network 120.

Beginning with FIG. 11A, the front perspective view of exemplary model 1100 for an exemplary video camera component 1044-1054 is shown. FIG. 11A includes base component 1108, connector components 1112, rotation assembly 1110, optional locking device 1106, display component 1102, video screen 1103 and visor 1104.

FIG. 11B illustrates the back perspective view of this model 1100, showing the aforementioned base component 1108, rotation assembly 1110, display component 1102, and visor 1104. FIG. 11B also shows green indicator light 1114, red indicator light 1116, and mounting arm 1118.

In one or more embodiments, visor 1104 prevents reflection of light on screen 1103 from a direction above model 1100, including any other type of glare protection. Also, in one or more embodiments, model 1100 is designed to be mounted on one or more tripods. Here, base 1108 is mounted on top of any type of known or specially designed tripod.

In one embodiment, rotation assembly 1110 permits only upward and downward rotational tilt of display component 1102 (including screen 1103 and visor 1104) from base component 1108, respectively permitting viewing of image perspectives based upon upward and downward tilting of a video camera component 1044-1054. Here, model 1100 is fixedly attached to a tripod, and the movement of the respective tripod arms (see FIGS. 12B, 12C) permits model 1100 to be rotated leftward and rightward in directions horizontal to the plane of the ground, and to be rotated leftward and rightward in directions vertical to the plane of the ground, respectively permitting viewing of image perspectives based upon rotating of a video camera component 1044-1054.

In another embodiment, rotation assembly 1110 permits any one of: (i) upward and downward rotational tilt of display component 1102 (including screen 1103 and visor 1104) from base component 1108, respectively permitting viewing of image perspectives based upon upward and downward tilting of a video camera component 1044-1054, and (ii) leftward and rightward horizontal rotation of display component 1102 (including screen 1103 and visor 1104) from base component 1108, respectively permitting viewing of image perspectives based upon leftward and rightward rotation of a video camera component 1044-1054.

In the disclosed embodiments, connector components 1112 include any type of connector connecting model 1100, as a node in communications system 120, to another node. In one or more embodiments, connector components 1112 of a first node, for example model 1100 (of video camera components 1044-1054) permit its connection to an input/output component 310 of a system 300, for example, via connection to interface 616 (as shown in FIG. 6). Examples of connector components 1112 may include, for example, a proprietary 9-pin serial interface connector for a Playstation 2™ video game, a USB connector modified for use with an Xbox™ video game, a USB connector programmed to connect to any personal computer video game, and any other type of connector. As another example, connector 1112 may be a connector for a communications interface for communications over communications network 120, such as, for example, a LAN 510 and a WAN 508.

Figure 12A:
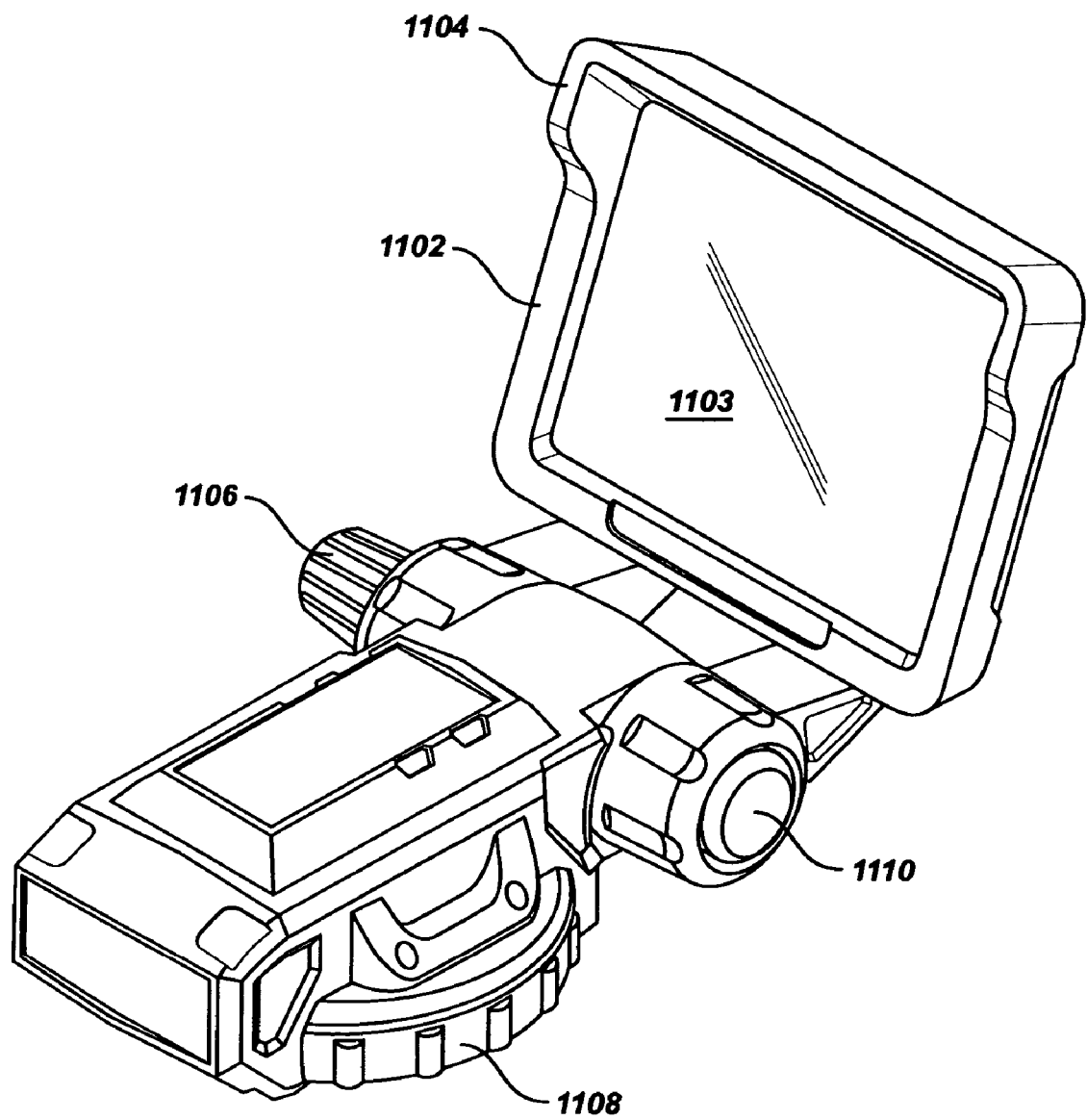
FIGS. 12A, 12B respectively illustrate perspective views of another model of an exemplary video camera component described in the disclosed embodiments.
Figure 12B:
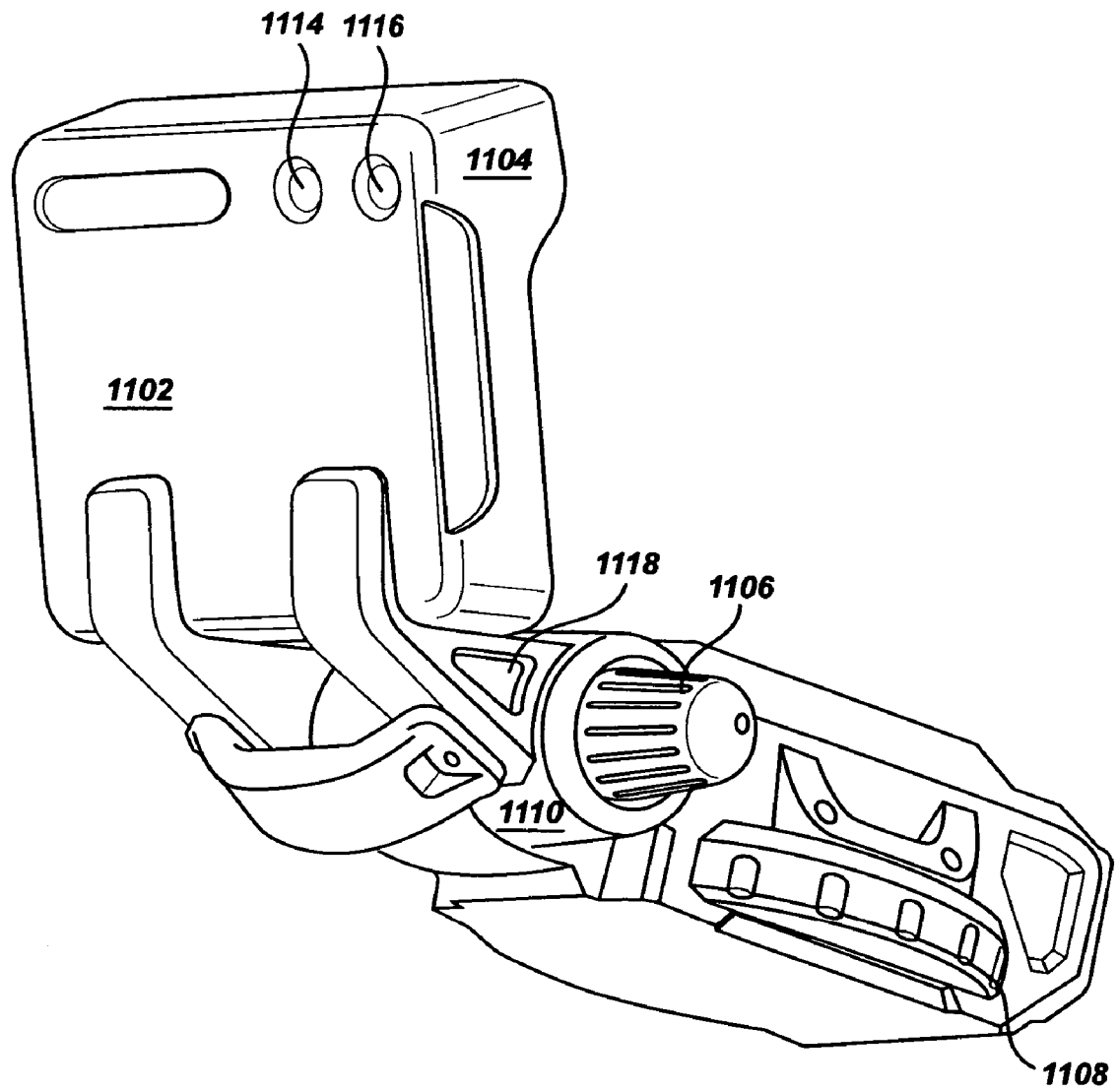

FIGS. 12A and 12B illustrate perspective views of another model 1200 of an exemplary video camera component 1044-1054 described in the disclosed embodiments. In one or more embodiments, model 1100 represents a node 102-108 functioning within a communications network 120. The front perspective view of this model for an exemplary video camera component 1044-1054 is shown to include base component 1108, rotation assembly 1110, display component 1102, video screen 1103, visor 1104, optional locking device 1106, mounting arm 1118, and indicator lights 1114, 1116.

Figure 12C:
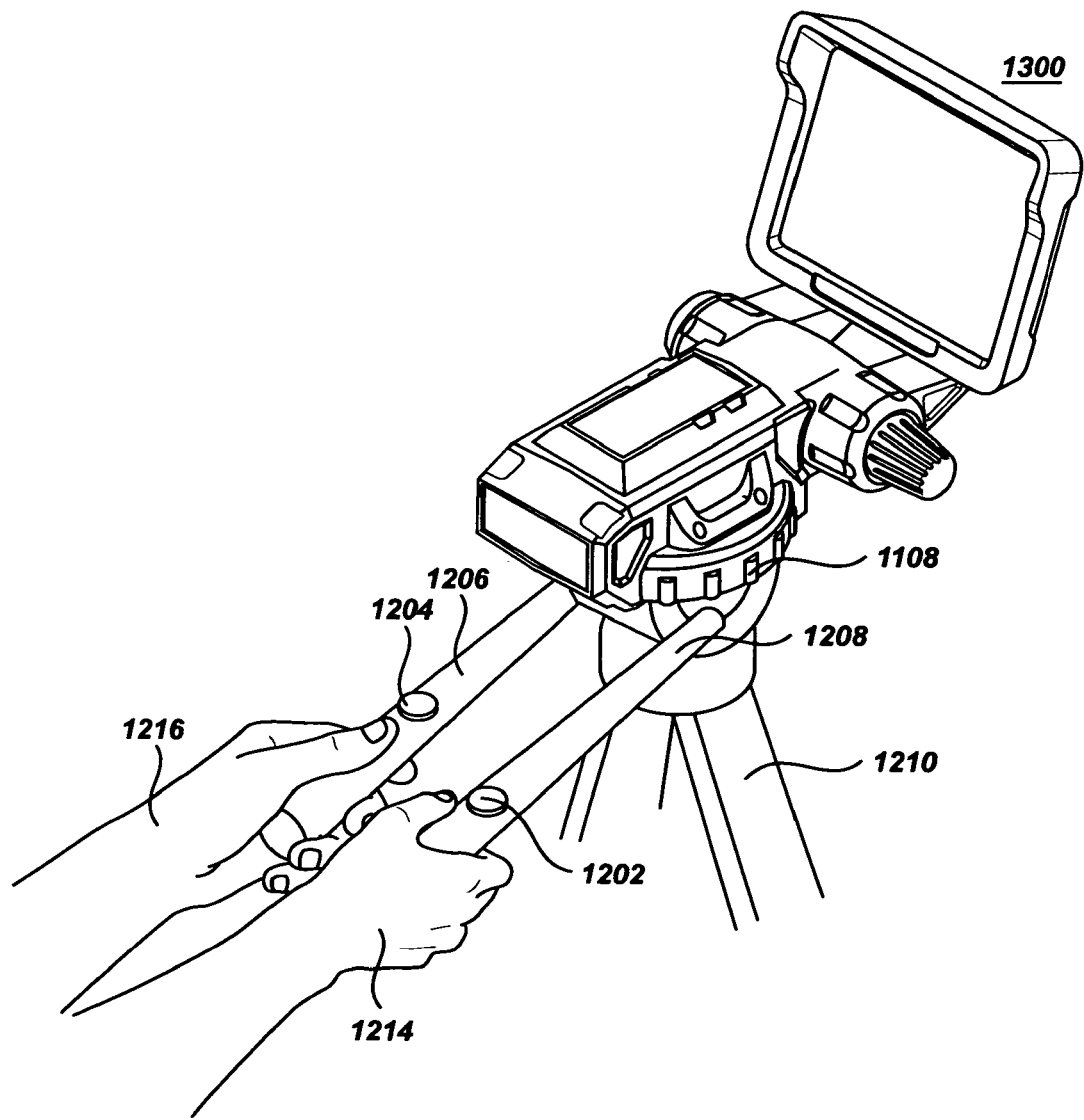
FIG. 12C illustrates a perspective view of a model of an exemplary video camera component mounted on the pan-tilt head of an exemplary tripod, further illustrating positional features for user input on the device.
Figure 13A:
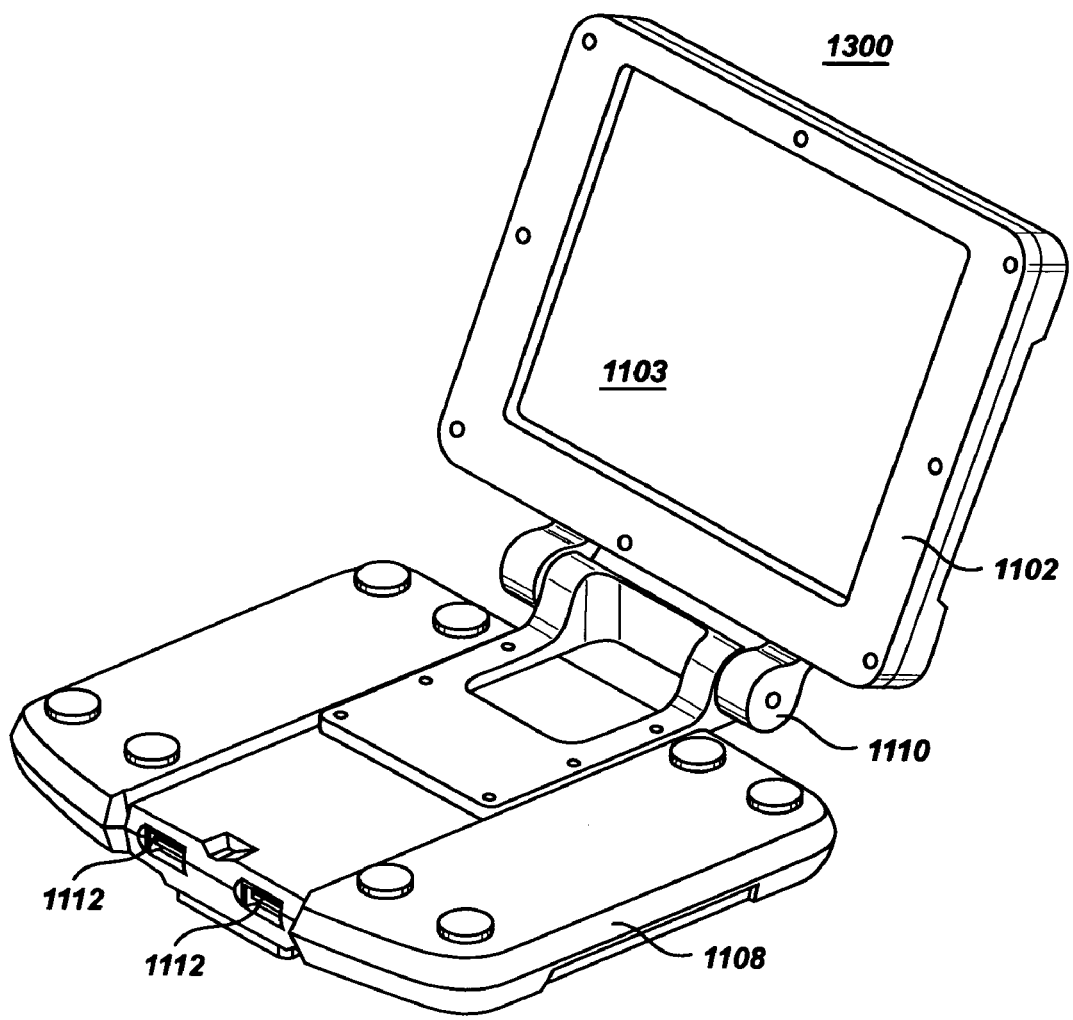
FIGS. 13A, 13B respectively illustrate perspective views of yet another model of an exemplary video camera component described in the disclosed embodiments.
Figure 13B:
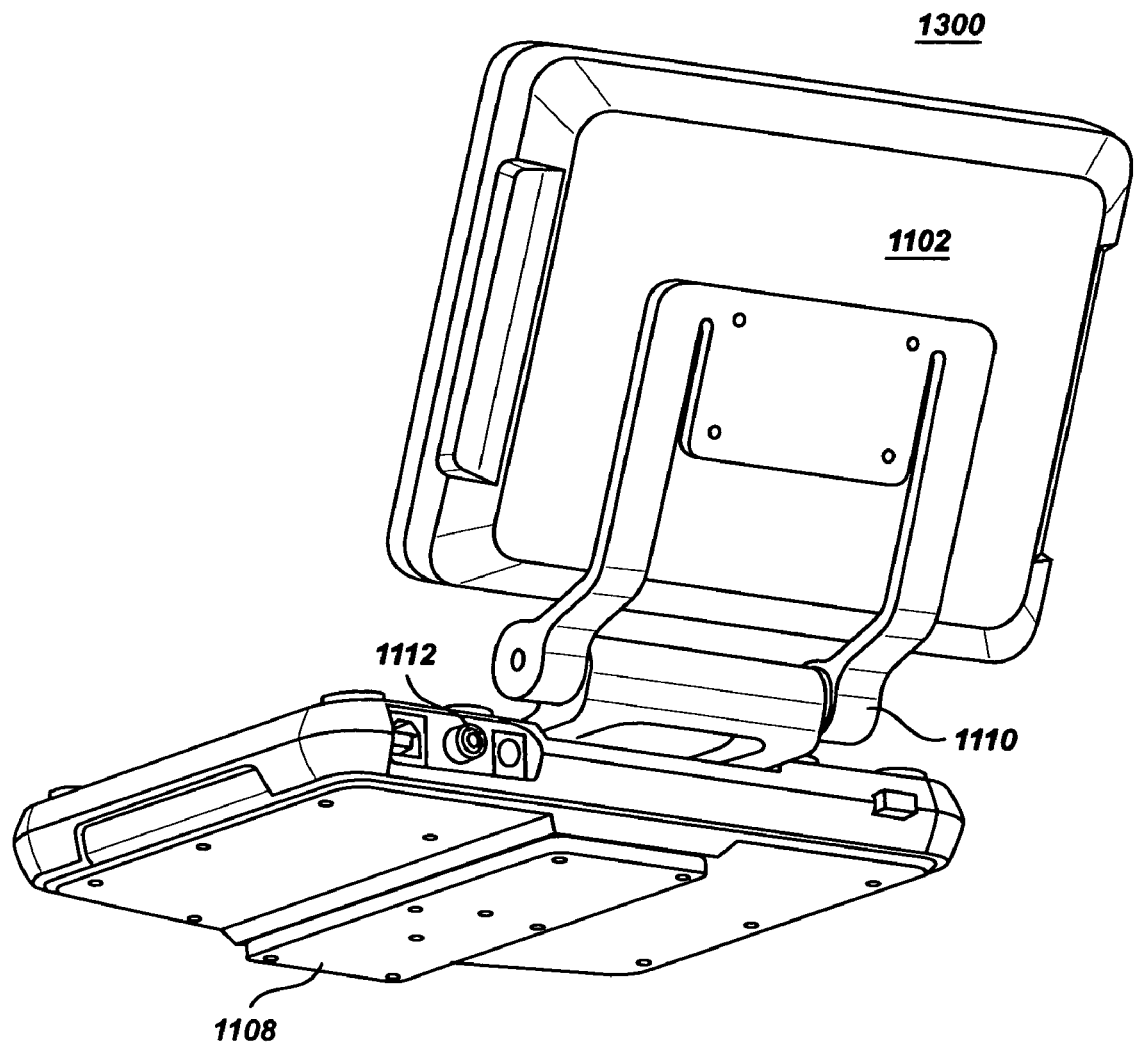

FIG. 12C illustrates a perspective view of an exemplary tripod having mounted on its pan-tilt head an exemplary video camera component 1044-1054 (see FIGS. 13A, 13B). As shown, base component 1108 of model 1300 is mounted on the pan-tilt head of the exemplary tripod. The exemplary tripod includes a plurality of legs 1210, a left arm 1206, a right arm 1208, left thumb actuator 1204, and right thumb actuator 1202. In an exemplary embodiment, the fluid in the pan-tilt head makes the movement of the camera component, including signals relating to the movement, less jerky and more life-like.

Figure 14A:
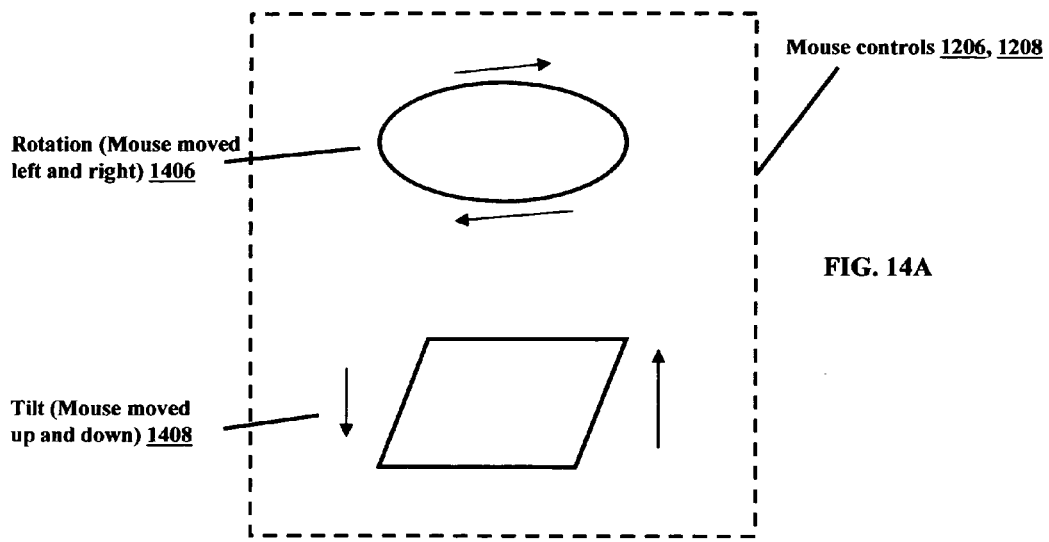
FIG. 14A illustrates a representative view of how rotation and tilt of an exemplary video camera component in the disclosed embodiments emulates input by a computer mouse input device.

Extensible respective left and right arms 1206, 1208 may be tilted in the up/down direction to tilt the camera view upward or downward. Extensible respective left and right arms 1206, 1208 may also be rotated in a direction horizontal to the plane of the ground to rotate the camera view leftward or rightward. Referring to FIG. 14A, in an exemplary video game system 300 adapted for a personal computer, movement of a mouse upward or downward (1408) simulates the motion of an up/down tilting view, whereas movement of the mouse leftward or rightward (1406) simulates a left/right rotating view. Accordingly, in these disclosed embodiments, the aforementioned motion of tilting video camera components 1044-1054 in the upward and downward directions, and rotating them in the leftward and rightward direction, are mapped to corresponding mouse commands to simulate movement of the mouse for personal computer based video gaming systems. It should be noted that rotation of the device in the leftward and rightward directions in response to input signals, causing the rolling of the horizon (called "rolling" or "Dutching") is also enabled.

FIG. 12C also illustrates positional features for user input on the device. As shown, the camera person's right hand 1214 holds a right arm 1208, and the camera person's left hand 1216 holds a left arm 1206. Movement of right arm 1208 and left arm 1206 permit the aforementioned tilting and rotation of the video camera, permitting viewing of image perspectives based upon upward, downward tilting of a video camera component, and viewing of image perspectives based upon leftward, rightward rotating of a video camera component.

Figure 14B:
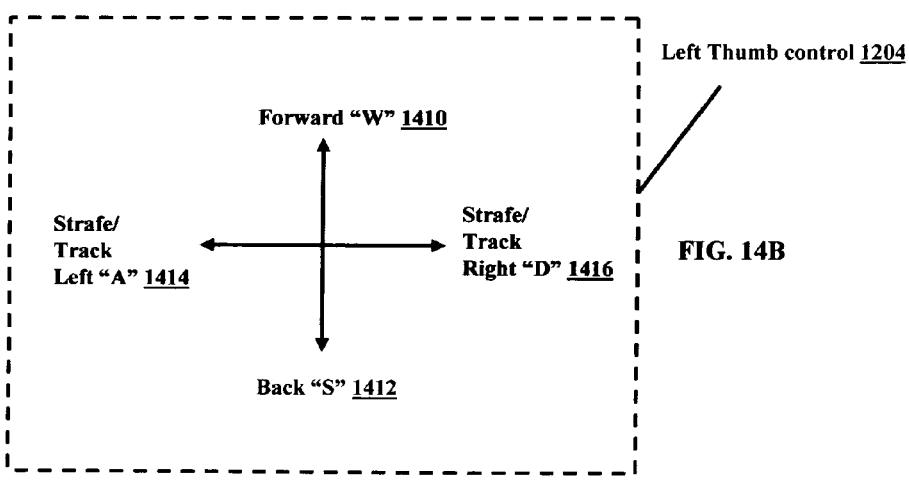
FIGS. 14B, 14C respectively illustrate representative views of how thumb controls of an exemplary video camera component in the disclosed embodiments emulate input by a video game controller device.

The camera person's left thumb is positioned to actuate the left thumb actuator 1204. Referring to FIG. 14B, in one embodiment the left thumb actuator 1204 (i) permits a view simulating or resembling a translation of the camera leftward 1414 or rightward 1416; and (ii) permits a view simulating or resembling a translation of the camera forward 1410 or backward 1412. These motions are referred to as track, truck, dollie motions of a camera, or flying a camera, in art-recognized parlance. As shown in FIG. 14B, in an exemplary video game system 300 adapted for a personal computer, the keyboard may be used to reflect these motions, including but not limited to, an "A" 1414 causing a left track, a "D" 1416 causing a right track, a "W" 1410 causing a forward track, and an "S" 1412 causing a backward track. A video game controller may cause the same output for a video game console or a personal computer, based on the respective leftward, rightward, forward, and backward displacement of the video game controller handle. Accordingly, in these disclosed embodiments, the aforementioned actuations of the left thumb actuator 1204 may be respectively mapped to the leftward, rightward, forward, and backward motions of an exemplary video game controller (or other type of controller) to implement the aforementioned tracking controls.

Figure 14C:
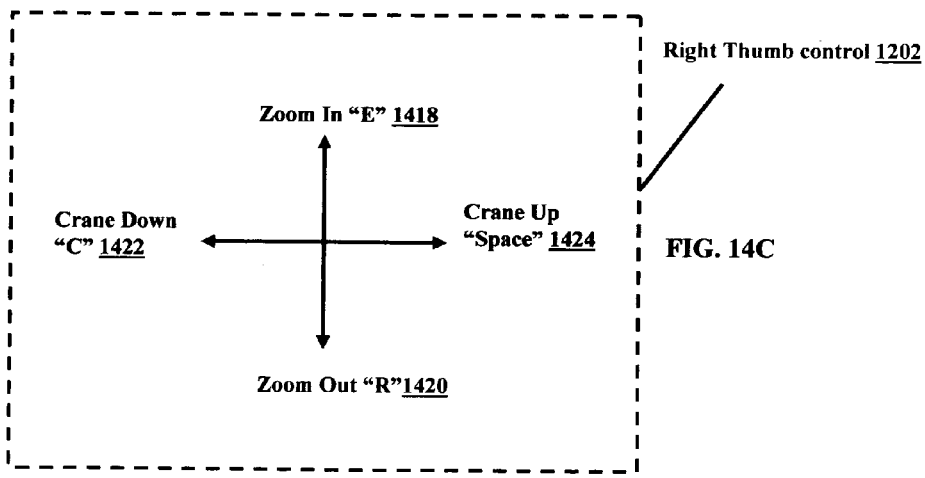

In exemplary embodiments, the camera person's right thumb is positioned to actuate the right thumb actuator 1202. Referring to FIG. 14C, in one embodiment the right thumb actuator 1202 (i) permits views simulating or resembling a craning of the camera upward 1424 or downward 1422; and (ii) permits views simulating or resembling zooming of the camera inward 1418 and outward 1420. As shown in FIG. 14C, in a video game system 300 adapted for a personal computer, the keyboard may be used to reflect these motions, with a "C" 1422 causing a left crane operation, a " " (space) 1424 causing a right crane operation, an "E" 1418 causing a zooming inward operation, and an "R" 1420 causing a zooming outward operation. A video game controller may cause the same output for the personal computer, based on the respective leftward, rightward, forward, and backward displacement of the video game controller handle. Accordingly, in these disclosed embodiments, the aforementioned actuations of the right thumb actuator 1202 may be respectively mapped to the aforementioned leftward, rightward, forward, and backward motions of an exemplary video game controller (or other type of controller) to implement the aforementioned craning and zooming controls.

FIGS. 13A, 13B respectively illustrate perspective views of the aforementioned third model 1300 of an exemplary video camera component 1044-1054 described in the disclosed embodiments, which may also be mounted on the pan-tilt head of an exemplary tripod, as illustrated with respect to FIG. 12C. Model 1300 is a design that is thinner and is foldable like a laptop computer. As shown, model 1300 includes base component 1108, connector components 1112, rotation assembly 1110, display component 1102 and video screen 1103.

Figure 15:
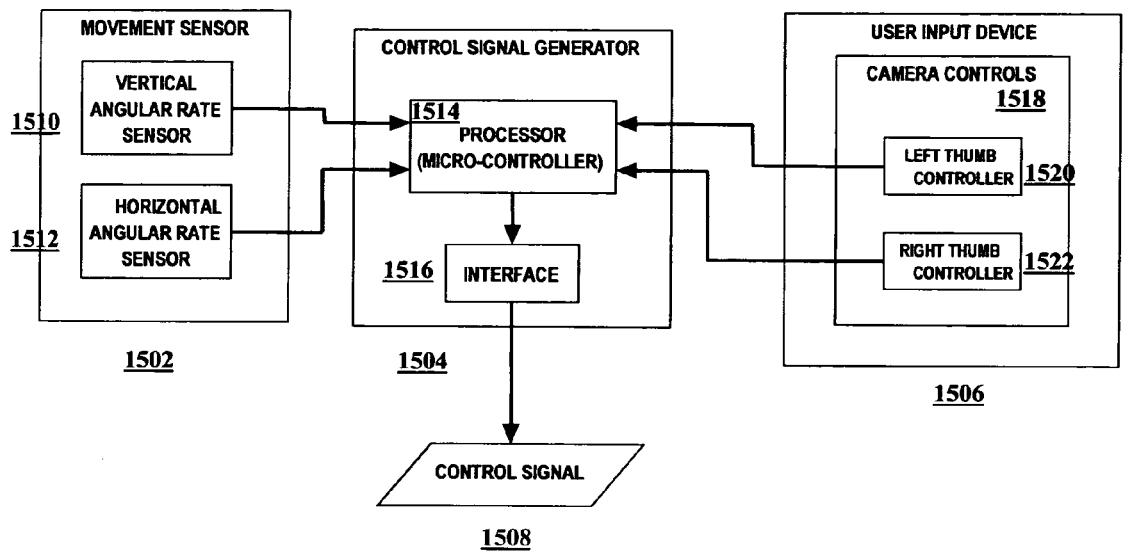
FIG. 15 illustrates a generic functional block diagram view for an exemplary control device of an exemplary video camera component provided in the disclosed embodiments.

FIG. 15 illustrates a generic functional block diagram view for an exemplary control device of an exemplary video camera component 1044-1054 provided in the disclosed embodiments. FIG. 15 illustrates movement sensor 1502, control signal generator 1504, user input device 1506, which includes cameral controls 1518, and a control signal 1508 generated by control signal generator 1504. Movement sensor 1502 includes a vertical angular rate sensor 1510 and a horizontal angular rate sensor 1512. Control signal generator 1504 includes a processor (for example, a micro-controller), and interface 1516. Camera controls 1518, of user input device 1506, include a left thumb controller 1520 and a right thumb controller 1522.

The vertical angular rate sensor 1510 senses the aforementioned upward and downward tilt rotation, by measuring the rate of movement of a video camera component in upward and downward tilting rotations. The horizontal angular rate sensor 1512 senses the aforementioned leftward and rightward rotations parallel to the ground plane, by measuring the rate of movement of a video camera component in leftward and rightward rotations. In an exemplary embodiment, respective vertical and horizontal gyroscopes are used as the aforementioned vertical 1510 and horizontal 1512 angular rate sensors. Any other types of motion sensors suited for the same purposes may be used as well, including accelerometer sensors that measure the respective accelerations, rather than the respective angular rates, of the aforementioned tilting up/down and rotating left/right motions. Respective signals corresponding to the vertical angular rate and horizontal angular rate of the video camera component are transmitted to processor 1514.

The left thumb controller 1520 generates a control signal based upon the aforementioned movement of the left thumb actuator 1204. Similarly, right thumb controller 1522 generates a control signal based upon the aforementioned movement of the right thumb actuator 1202. The respective left and right thumb control signals are transmitted to processor 1514.

Processor 1514 generates one or more control signals 1508 for transmission to an exemplary system 300, which may be, for example, a proprietary video game console or a personal computer, through an appropriate interface 1516.

Figure 16:
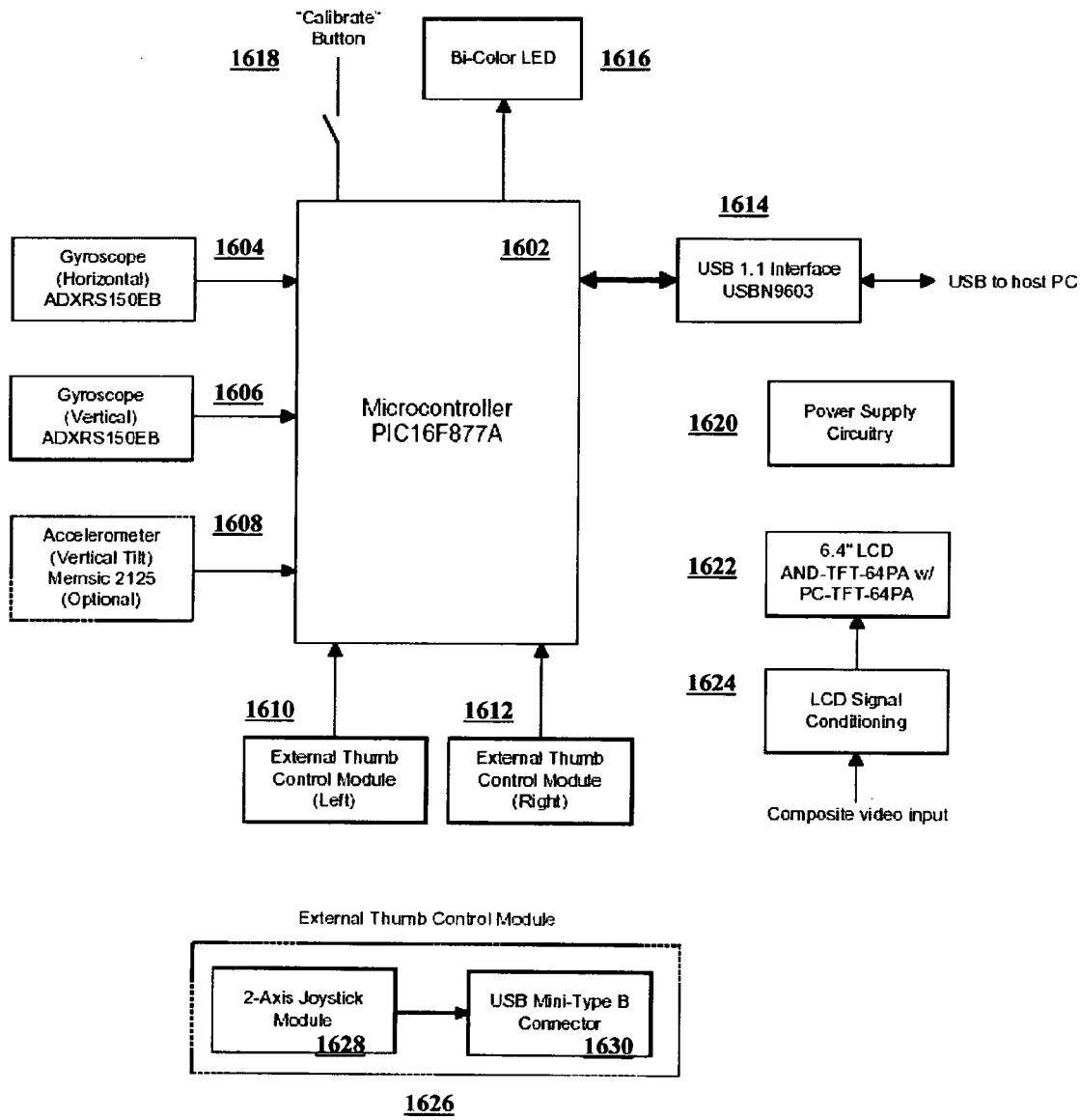
FIG. 16 illustrates a detailed functional block diagram view for an exemplary control device of an exemplary video camera component provided in the disclosed embodiments.

FIG. 16 illustrates a detailed functional block diagram view for the exemplary control device illustrated in FIG. 15. FIG. 16 is shown to include processor (such as a microcontroller) 1602, horizontal gyroscope 1604, vertical gyroscope 1606, accelerometer 1608, external left thumb control module 1610, external right thumb control module 1612, an interface 1614 (which is a type of interface 616 shown in FIG. 6), bi-color light emitting diode (LED) display 1616, calibrate button 1618, power supply circuitry 1620, LCD display module 1622, LCD signal conditioning module 1624. FIG. 16 also includes a video game controller module 1628 connected to an exemplary USB mini-type connector 1630 for an exemplary external thumb control module 1626, which may be either external left thumb control module 1610 or external right thumb control module 1612.

The control device may use one or more sensors used to measure any required parameter. For example, as shown both an accelerometer 1608 and a gyroscope 1606 are employed to measure motion in the up/down tilt directions, specifically the respective acceleration and rate of displacement of the video camera component, whereas in this embodiment, a single gyroscope 1604 is employed to measure motion in the left/right rotation directions, specifically the respective rate of displacement of the video camera component. As known to skilled persons, however, any combination of sensors may be used to measure relative displacement in any type of direction. The outputs of these sensors are measured in volts, for example, as between 0 and 5 volts. Processor 1602 is programmed to read the voltages, and convert the analog signals into digital signals for transmission by interface 1614 (or other pertinent interface 616) to input/output component 310 of system 300.

In one embodiment, video game controller module 1628 comprises two potentiometers, which are variable resistors, one for measuring movement in the forward/backward directions, and one for measuring movement in the leftward/rightward directions. The resistance varies in each case based on the relative displacement of the video game controller handle. The output of each potentiometer is measured, for example, as between 0 and 5 volts. Processor 1602 is programmed to read the voltages, and convert the analog signals into digital signals for transmission by interface 1614 (or other pertinent interface 616) to input/output component 310 of system 300.

As noted, the type of interface 1614 depends upon the system 300. For example, if system 300 is a Playstation 2™ video game, interface 1614 may be a proprietary 9-pin serial interface connector. If system 300 is an Xbox™ video game, interface 1614 may be a USB connector modified for use with an Xbox™ video game. If system 300 is a personal computer executing a personal computer video game, interface 1614 may be a USB connector programmed to connect processor 1602 to any personal computer video game device. Skilled persons will realize that the foregoing interfaces are presented by way of illustration, and that the present embodiments are not limited to the foregoing interfaces, but may instead include any type of interfaces.

Because gyroscopes and other components may have sensitivities based on ambient temperatures and other external factors, the values emitted by such devices to processor 1602 and measured by processor 1602 may become inaccurate. Accordingly, when actuated by a user calibrate button 1618 sets the inputs to processor 1602 to null or zero value. This feature increases the accuracy of the control device of FIG. 16 through extended usage.

Processor 1602 is programmed to map the control signals generated by components 1604, 1606, 1608, 1610 and 1612 to inputs expected by system 300, and to do so in an efficient manner. For example, in one embodiment the analog input ports are all continuously read 16 times, with each reading being separated from the next in 10 millisecond intervals. The result of each of the 16 reads is averaged, to produce more accurate outputs from processor 1602.

The mapping may be performed based on parameters expected by system 300. For example, in one embodiment of processor 1602, the output digital signals resulting from the input analog signals of devices 1604-1608 are transmitted to system 300 separated by predetermined time intervals from the output digital signals resulting from the input analog signals of devices 1610-1612. In another embodiment, however, the output digital signals resulting from the input analog signals of all devices 1604-1612 are transmitted to system 300 at or about the same time intervals.

In addition, the time delay between output transmissions from processor 1602 to interface 1614, or alternatively from interface 1614 to system 300, may be set according to the requirements of system 300. For example, (i) in an embodiment where system 300 is an Xbox™ video game, the delay may be set to 10 milliseconds, (ii) in an embodiment where system 300 is a personal computer running a personal computer adapted video game, the delay may be set to 4 milliseconds.

The bi-color LEDs 1616 provide one or more single or multi-colored displays for the user. For example, a red color LED may indicate that a battery power (if any) is running low, or that the device has been powered up, but has not been connected to system 300. As another example, a green color LED may indicate that three is sufficient battery power (if any), or that the device has been powered up and has been connected to system 300.

In an exemplary embodiment, processor 1602 runs firmware. For example, a developer develops code pertaining to functions of processor 1602 in the C programming language. A compiler is used to link convert the source code into binary object code, link the object code modules together, and generate machine language assembly instructions. The assembly instructions are loaded into processor 1602 through an appropriate port, such as a parallel port, printer port or USB port, using for example a device programmer, such as the model BP1200, provided by BP Microsystems, Inc., or for example, a circuit debugger.

In different exemplary environments, a variety of different manufactured device components may be used to perform the aforementioned functions. For example, in one exemplary embodiment, (i) microcontroller (processor) 1602 is a model Microchip PIC16F877A manufactured by Microchip Technology, Inc.; (ii) accelerometer 1608 is the model Memsic 2125EB distributed by Parallax, Inc., (iii) gyroscopes 1604, 1608 are models ADXRS150EB manufactured by Analog Devices, Inc.; (iv) video game controller module 1628 is a model CTS253B103B60NA manufactured by CTS Corporation, and USB mini-type connector 1630 is a model 15430384-100 manufactured by Delphi Connection Systems, Inc.; (v) LCD display modules 1622 include models AND-TFT-64PA and PC-TFT-64PA manufactured by AND Electronics, Inc.; (vi) bi-color LED 1616 is a model ZMM5231B-7 manufactured by Diodes, Inc.; and (vii) calibrate button 1618 is a model MTH2UOANAGX manufactured by E-Switch, Inc.

Figure 17:
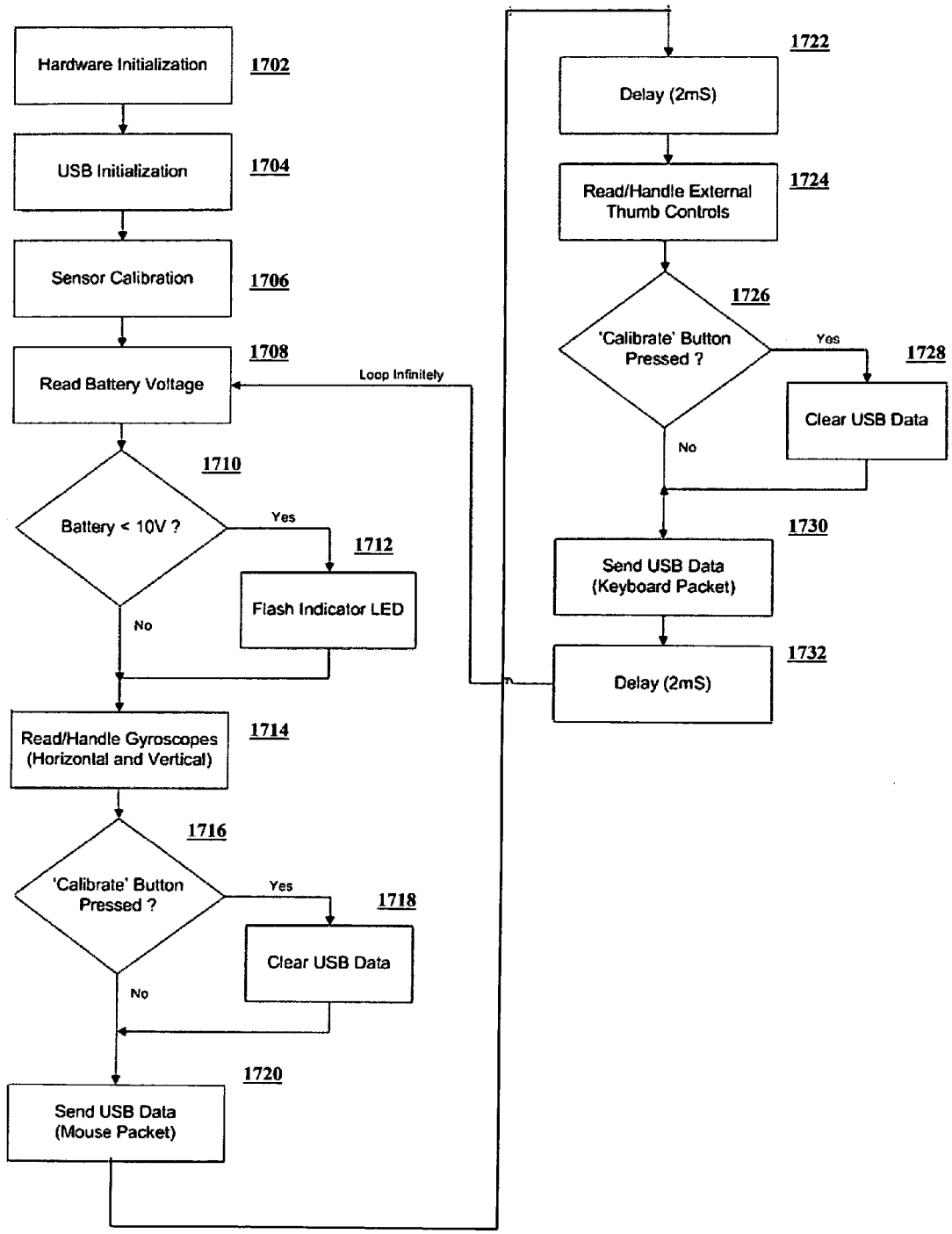
FIG. 17 illustrates a flow chart of the method for one embodiment pertaining to an exemplary control device of an exemplary video camera component provided in the disclosed embodiments.

FIG. 17 illustrates a flow chart of the method for one embodiment pertaining to an exemplary control device of an exemplary video camera component provided in the disclosed embodiments.

Initially the hardware is initialized (step 1702), which may include setting the proper configuration for the firmware running on processor 1602, including configuring the analog-to-digital, initially setting the color of LED 1616 to red, configure the input and output ports, and configuring the processor modules by turn off unneeded modules and turning on needed modules.

Next the interface device, such as USB 1614, is initialized and configured (step 1704) to interface with external system 300, which includes setting up and preparing the necessary USB packets and related protocols.

The input voltages are initially automatically set to null or zero values to initially calibrate processor 1602, which has the same effect as calibration provided by calibrate button 1618 (step 1706).

In one or more embodiments, the video camera component may be powered by an internal rechargeable battery, or by alternating current (AC) through connection to an external outlet. If the device is battery powered, the battery may be checked to determine whether it is below a predefined threshold, such as 10V (step 1710), and LED 1616 may be set to red to indicate low batter power (step 1712).

Processor 1602 optionally reads the control signals inputs from the gyroscope and accelerometer components 1604-1608 (step 1714), and outputs a corresponding output signal to interface 1614. However, if the calibrate button 1618 is pressed (step 1716) the output data to interface 1614 must be cleared out.

Processor 1602 optionally reads control signals inputs from a mouse controller or other controller, which are not shown (step 1720), and outputs a corresponding output signal to interface 1614. However, if the calibrate button 1618 is pressed the output data to interface 1614 must be cleared out (not shown).

Processor 1602 also optionally reads the control signals inputs from the thumb control modules 1610, 1612 (step 1724), and outputs a corresponding output signal to interface 1614. However, if the calibrate button 1618 is pressed (1726) the output data to interface 1614 must be cleared out (1728).

Processor 1602 also optionally reads control signals inputs from a keyboard or other controller, which are not shown (step 1730), and outputs a corresponding output signal to interface 1614. However, if the calibrate button 1618 is pressed the output data to interface 1614 must be cleared out (not shown).

Depending upon the input parameters required by system 300, a time delay, such as 2 milliseconds, may be required to separate the respective outputs from one another (steps 1722, 1732). The input process is repeated by reverting control back to step 1708.

Figure 18A:
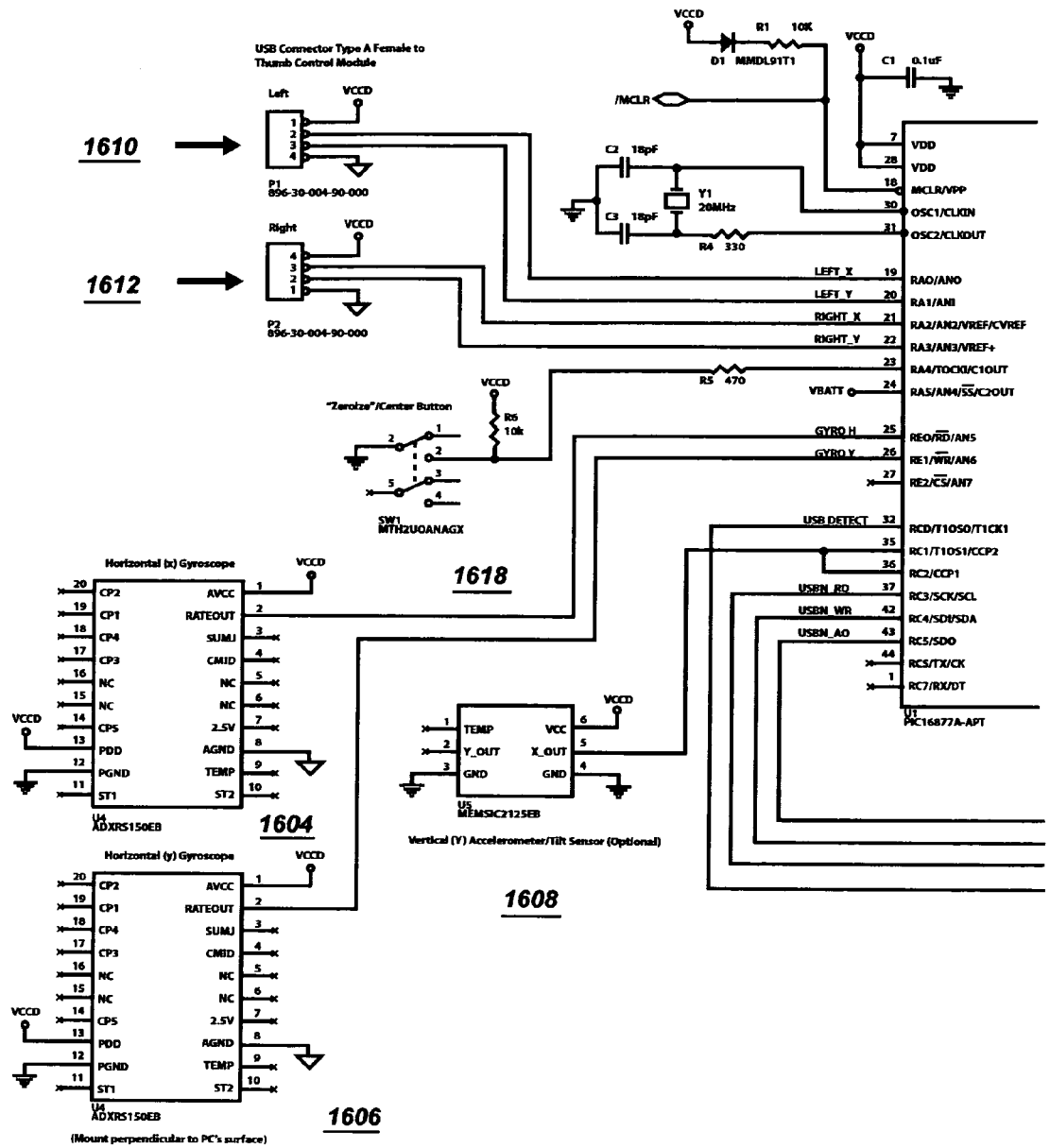
FIG. 18 illustrates a detailed schematic diagram view for a first portion of an exemplary control device of an exemplary video camera component provided in the disclosed embodiments.
Figure 18B:
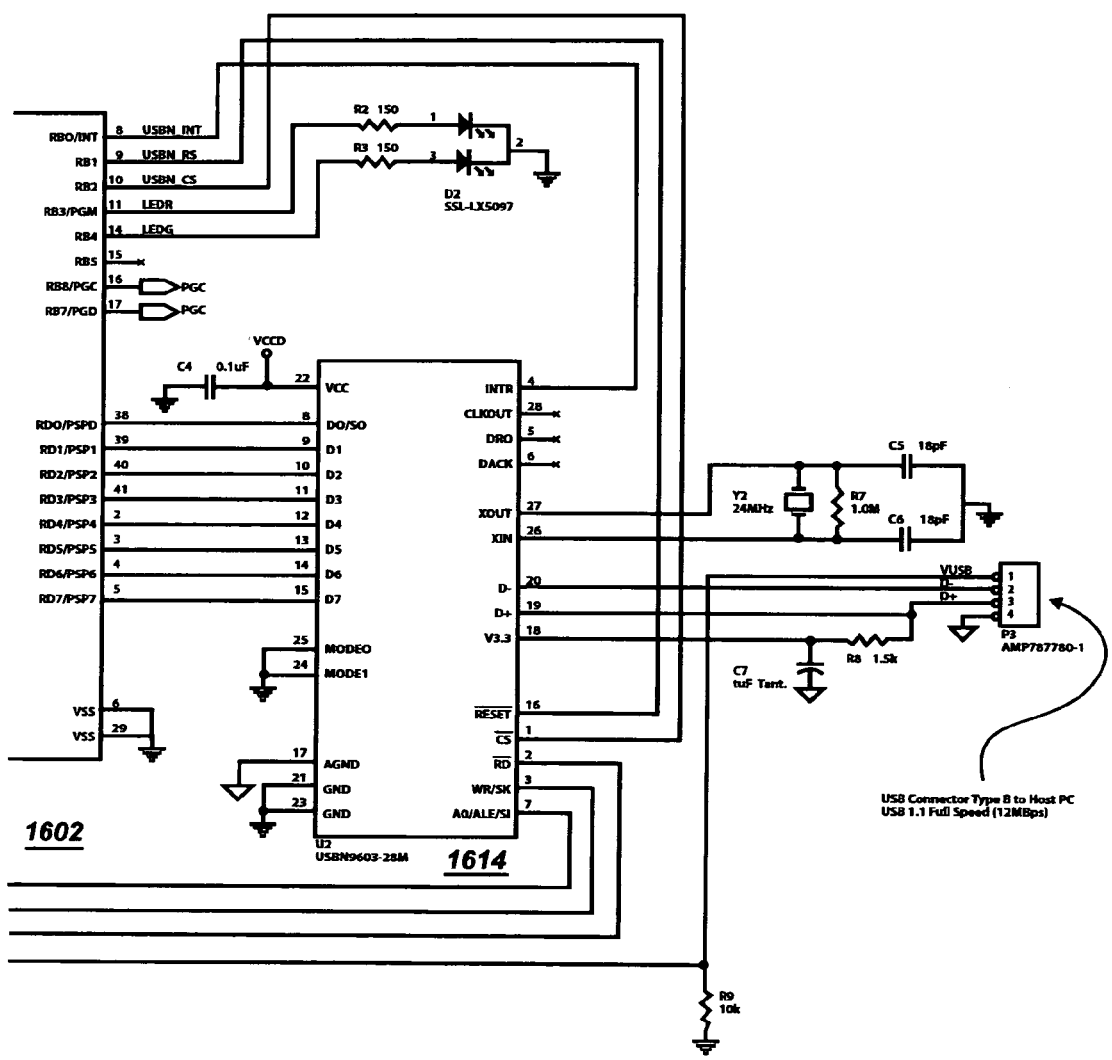
Figure 19:
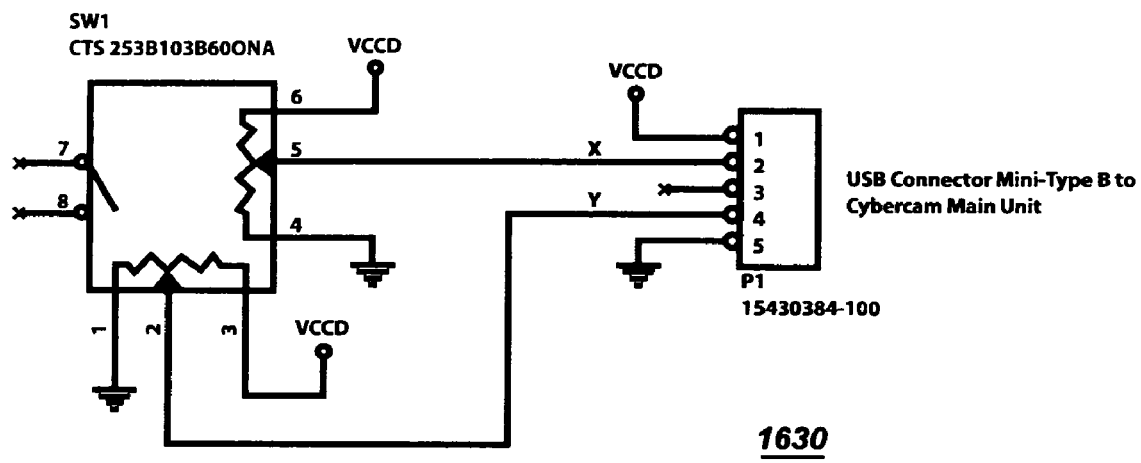
FIG. 19 illustrates a detailed schematic diagram view for a second portion of an exemplary control device of an exemplary video camera component provided in the disclosed embodiments.

FIG. 18 illustrates a detailed schematic diagram view for a first portion of an exemplary control device of an exemplary video camera component provided in the disclosed embodiments. FIG. 19 illustrates a detailed schematic diagram view for a second portion of an exemplary control device of an exemplary video camera component provided in the disclosed embodiments. The respective components thereon are labeled as defined above.

VII. Conclusion

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. An apparatus comprising:
   a camera control input device configured to provide a camera control input device signal in response to a user action;
   a movement sensor configured to provide a movement sensor signal in accordance with a movement of the apparatus, the movement sensor comprising any one of:
   a horizontal angular rate sensor configured to provide a horizontal movement signal in accordance with a horizontal rate of movement of the apparatus;
   a vertical angular rate sensor configured to provide a vertical movement signal in accordance with a vertical rate of movement of the apparatus;
   a horizontal angular acceleration sensor configured to provide the horizontal movement signal in accordance with a horizontal acceleration of the apparatus; and
   a vertical angular rate sensor configured to provide the vertical movement signal in accordance with a vertical acceleration of the apparatus; and
   a control signal generator configured to generate a camera control signal comprising a virtual camera control signal for controlling a virtual camera within a virtual environment that is entirely generated by a software application, the virtual environment being generated without images captured by a camera with an image sensor, and the virtual camera control signal being based on the camera control input device signal and the movement sensor signal.

2. An apparatus in accordance with claim 1, wherein the camera control signal comprises at least one of a plurality of camera commands comprising:
   a crane command;
   a truck command;
   a zoom command;
   a roll command;
   a pan command; and
   a tilt command.

3. An apparatus in accordance with claim 1, wherein said virtual environment comprises any one of:
   a video game software application;
   a digital filmmaking application;
   a three-dimensional animation application;
   a computer aided design (CAD) or computer aided manufacturing (CAM) application;
   a holography application;
   a medical analysis or surgical analysis application;
   simulations of military equipment and personnel readiness war games applications;
   flight simulation training applications;
   modeling simulations for biological analyses applications;
   modeling simulations for chemical analyses applications;
   modeling simulations for molecular analyses applications; and
   simulations relating to graphical rendering of building facilities applications.

4. An apparatus in accordance with claim 1, wherein a format of the virtual camera control signal is in accordance with any one of a computer mouse output, a computer keyboard output, and a video game controller output.

5. An apparatus in accordance with claim 1, wherein the controller comprises:
   a processor programmed to convert the camera control input device signal and the movement sensor signal into the virtual camera control signal; and
   an interface configured to generate, based on the virtual camera control signal, computer input signals emulating any one of video game controller output signals, computer keyboard output signals and computer mouse output signals.

6. An apparatus in accordance with claim 1, wherein the camera control input device comprises at least one switch.

7. An apparatus in accordance with claim 1, wherein the camera control input device comprises at least one finger operated control device.

8. An apparatus in accordance with claim 7, wherein the at least one finger operated device comprises a plurality of thumb controllers.

9. An apparatus comprising:
   a camera control input device configured to provide a camera control input device signal in response to user actions;
   a horizontal movement sensor configured to provide a horizontal movement signal in accordance with a horizontal movement of the apparatus, the horizontal movement sensor comprising any one of a horizontal angular acceleration sensor configured to provide the horizontal movement signal in accordance with a horizontal acceleration of the apparatus and a horizontal angular rate sensor configured to provide the horizontal movement signal in accordance with a horizontal rate of movement of the apparatus;
   a vertical movement sensor configured to provide a vertical movement signal in accordance with a vertical movement of the apparatus, the vertical movement sensor comprising any one of a vertical angular rate sensor configured to provide the vertical movement signal in accordance with a vertical rate of movement of the apparatus and a vertical angular rate sensor configured to provide the vertical movement signal in accordance with a vertical acceleration of the apparatus; and
   a control signal generator configured to generate a virtual camera control signal based on at least one of a plurality of signals comprising the horizontal movement signal, the vertical movement signal, and the camera control input device signal and interpretable by a software application as an instruction for changing a view within a virtual environment that is entirely generated by the software application, the virtual environment being generated without images captured by a camera with an image sensor.

10. An apparatus in accordance with claim 9, wherein the virtual camera control signal results in a movement of the virtual camera within the virtual environment emulating the movement of the apparatus.

11. An apparatus in accordance with claim 10, wherein the control signal generator is further configured to generate the virtual camera control signal comprising a pan command in response to a rotation of the apparatus about an axis orthogonal to the ground plane.

12. An apparatus in accordance with claim 10, wherein the control signal generator is further configured to generate the virtual camera control signal comprising any one of a tilt command and a roll command in response to rotations of the apparatus about axes parallel to the ground plane.

13. An apparatus in accordance with claim 9, wherein the virtual camera control signal comprises at least one of a plurality of camera commands for controlling a virtual camera within a virtual environment generated by the software application, the plurality of camera commands comprising:
   a crane up command;
   a crane down command;
   a truck left command;
   a truck right command;
   a truck forward (global) command;
   a truck backward (global) command;
   a pan right command;
   a pan left command;
   a tilt up command;
   a tilt down command;
   a roll left command;
   a roll right command;
   a zoom in command; and
   a zoom out command.

14. An apparatus in accordance with claim 9, wherein the software application is any one of:
   a video game software application
   a digital filmmaking application;
   a three-dimensional animation application;
   a computer aided design (CAD) or computer aided manufacturing (CAM) application;
   a holography application;
   a medical analysis or surgical analysis application;
   simulations of military equipment and personnel readiness war games applications;
   flight simulation training applications;
   modeling simulations for biological analyses applications;
   modeling simulations for chemical analyses applications;
   modeling simulations for molecular analyses applications; and
   simulations relating to graphical rendering of building facilities applications.

15. An apparatus in accordance with claim 9, further comprising a visual output device configured to present at least a portion of the virtual environment.

16. An apparatus in accordance with claim 15, wherein the at least a portion of the virtual environment is the view of the virtual environment captured by the virtual camera.

17. A camera simulating device for controlling a virtual camera capturing a view within a virtual environment that is entirely generated by a video software application, the virtual environment being generated without images captured by a camera with an image sensor, the camera simulating device comprising:
   a horizontal sensor configured to provide a horizontal movement signal in accordance with a horizontal movement of the camera simulating device, the horizontal sensor comprising any one of a horizontal angular acceleration sensor configured to provide the horizontal movement signal in accordance with a horizontal acceleration of the apparatus and a horizontal angular rate sensor configured to provide the horizontal movement signal in accordance with a horizontal rate of movement of the apparatus;
   a vertical sensor configured to provide a vertical movement signal in accordance with a vertical movement of the camera simulating device, the vertical sensor comprising any one of a vertical angular rate sensor configured to provide the vertical movement signal in accordance with a vertical rate of movement of the apparatus and a vertical angular rate sensor configured to provide the vertical movement signal in accordance with a vertical acceleration of the apparatus;
   a camera control input device configured to provide a camera control input device signal in response to user actions;
   a control signal generator configured to generate a virtual camera control signal based on at least one of a plurality of signals comprising the vertical movement signal, the horizontal movement signal, and the camera control input device signal, the virtual camera control signal recognizable by the video software application as at least one of a plurality of commands to change the view captured by the virtual camera of the virtual environment.

18. A camera simulating device in accordance with claim 17, wherein the virtual camera control signal results in a movement of the virtual camera within the virtual environment emulating the movement of the camera simulating device.

19. A camera simulating device in accordance with claim 18, wherein the control signal generator is further configured to generate the virtual camera control signal comprising a pan command in response to a rotation of the camera simulating device about an axis orthogonal to the ground plane.

20. A camera simulating device in accordance with claim 18, wherein the control signal generator is further configured to generate the virtual camera control signal comprising any one of a tilt command and a roll command in response to rotations of the camera simulating device about axes parallel to the ground plane.

21. A camera simulating device in accordance with claim 17, wherein the virtual camera control signal comprises at least one of a plurality of camera commands for controlling a virtual camera within a virtual environment generated by the video software application, the plurality of camera commands comprising:
   a crane up command;
   a crane down command;
   a truck left command;
   a truck right command;
   a truck in command;
   a truck out command;
   a pan right command;
   a pan left command;
   a tilt up command;
   a tilt down command;
   a roll left command;
   a roll right command;
   a zoom in command; and
   a zoom out command.

22. A camera simulating device in accordance with claim 17, further comprising a visual output device configured to present the view of the virtual environment captured by the virtual camera, and wherein the virtual environment comprises any one of:
   a video game software application;
   a digital filmmaking application;
   a three-dimensional animation application;
   a computer aided design (CAD) or computer aided manufacturing (CAM) application;

a holography application;
a medical analysis or surgical analysis application;
simulations of military equipment and personnel readiness war games applications;
flight simulation training applications;
modeling simulations for biological analyses applications;
modeling simulations for chemical analyses applications;
modeling simulations for molecular analyses applications; and
simulations relating to graphical rendering of building facilities applications.

23. A camera simulating device in accordance with claim 22, wherein the view of the virtual environment is a spectator view generated by the video game software application.

24. A method comprising:
receiving a camera control input device signal from a camera control input device;
receiving a movement sensor signal based on a movement of the user input device, the movement sensor signal comprising any one of a vertical rate signal, a vertical acceleration signal, a horizontal rate signal, and a horizontal acceleration signal; and
generating a camera control signal comprising generating a virtual camera control signal for controlling a virtual camera capturing a view within a virtual environment that is entirely generated by a software application, the virtual environment being generated without images captured by a camera with an image sensor, and the generating a virtual camera control signal being based on the camera control input device signal and the movement sensor signal.

25. A method in accordance with claim 24, wherein the camera control signal comprises at least one of a plurality of camera commands comprising:
a crane command;
a truck command;
a roll command;
a zoom command;
a pan command; and
a tilt command.

26. A method in accordance with claim 24, wherein the movement sensor signal is generated by any one of an angular rate sensor and an acceleration sensor.

27. A method in accordance with claim 26, wherein the movement sensor signal comprises:
a horizontal movement signal in accordance with a horizontal movement of the user input device; and
a vertical movement signal in accordance with a vertical movement of the user input device.

28. A method in accordance with claim 24, wherein said virtual environment comprises any one of:
a video game software application;
a digital filmmaking application;
a three-dimensional animation application;
a computer aided design (CAD) or computer aided manufacturing (CAM) application;
a holography application;
a medical analysis or surgical analysis application;
simulations of military equipment and personnel readiness war games applications;
flight simulation training applications;
modeling simulations for biological analyses applications;
modeling simulations for chemical analyses applications;
modeling simulations for molecular analyses applications; and
simulations relating to graphical rendering of building facilities applications.

29. A method in accordance with claim 24, wherein a format of the virtual camera control signal is in accordance with any one of a computer mouse output, a computer keyboard output and a video game controller output.

30. A method in accordance with claim 27, wherein generating the camera control signal further comprises:
converting the camera control input device signal and the movement sensor signal into the virtual camera control signal; and
generating, based on the camera input control device signal, computer input signals emulating any one of: video game controller signals, computer keyboard signals and computer mouse signals.

31. A method in accordance with claim 24, wherein the camera control input device comprises at least one switch.

32. A method in accordance with claim 24, wherein the camera control input device comprises at least one finger operated control device.

33. A method in accordance with claim 32, wherein the at least one finger operated control device comprises one or more thumb controls.

34. A method comprising:
receiving a horizontal movement signal in accordance with a horizontal movement of a control apparatus, the horizontal movement signal comprising any one of a horizontal rate signal and a horizontal acceleration signal;
receiving a vertical movement signal in accordance with a vertical movement of the control apparatus, the vertical movement signal comprising any one of a vertical rate signal, and a vertical acceleration signal;
receiving a camera control signal;
generating a virtual camera control signal based on at least one of a plurality of signals comprising the vertical movement signal, the horizontal movement signal, and the camera control signal, the virtual camera control signal interpretable by a software application as an instruction for changing a view within a virtual environment that is entirely generated by the software application, the virtual environment being generated without images captured by a camera with an image sensor.

35. A method in accordance with claim 34, wherein the virtual camera control signal results in a movement of the virtual camera within the virtual environment emulating the movement of the control apparatus.

36. A method in accordance with claim 35, wherein the generating step comprises generating the virtual camera control signal comprising a pan command in response to a rotation of the control apparatus about an axis orthogonal to the ground plane.

37. A method in accordance with claim 35, wherein the generating step comprises generating the virtual camera control signal comprising a tilt command or a roll command in response a rotation of the control apparatus about axes parallel to the ground plane.

38. A method in accordance with claim 24, wherein the virtual camera control signal comprises at least one of a plurality of camera commands for controlling a virtual camera within a virtual environment generated by the software application, the plurality of camera commands comprising:
a crane up command;
a crane down command;
a truck left command;
a truck right command;
a truck in command;
a truck out command;
a pan right command;
a pan left command;

a tilt up command;
a tilt down command;
a roll left command;
a roll right command;
a zoom in command; and
a zoom out command.

39. A method in accordance with claim 34, wherein the software application is any one of:
   a video game software application;
   a digital filmmaking application;
   a three-dimensional animation application;
   a computer aided design (CAD) or computer aided manufacturing (CAM) application;
   a holography application;
   a medical analysis or surgical analysis application;
   simulations of military equipment and personnel readiness war games applications;
   flight simulation training applications;
   modeling simulations for biological analyses applications;
   modeling simulations for chemical analyses applications;
   modeling simulations for molecular analyses applications; and
   simulations relating to graphical rendering of building facilities applications.

40. A method in accordance with claim 32, further comprising presenting at least a portion of the virtual environment through a visual output device.

41. A method in accordance with claim 40, wherein the at least a portion of the virtual environment is the view of the virtual environment captured by the virtual camera.

42. A method performed in a camera simulating device for generating a virtual camera control signal for controlling a virtual camera capturing a view within a virtual environment that is entirely generated by a video software application, the virtual environment being generated without images captured by a camera with an image sensor, the method comprising:
   receiving a horizontal movement signal of the camera simulating device, the horizontal movement signal comprising any one of a horizontal rate signal and a horizontal acceleration signal;
   receiving a vertical movement signal in accordance with a vertical movement of the camera simulating device, the vertical movement signal comprising any one of a vertical rate signal, and a vertical acceleration signal;
   receiving a camera control signal generated by a camera control input in response to user actions;
   generating a virtual camera control signal based on at least one of a plurality of signals comprising the vertical movement signal, the horizontal movement signal, and the camera control signal, the virtual camera control signal recognizable by the video software application as at least one of a plurality of camera commands to change the view captured by the virtual camera within the virtual environment.

43. A method in accordance with claim 42, wherein the virtual camera control signal results in a movement of the virtual camera within the virtual environment emulating the movement camera simulating device.

44. A method in accordance with claim 43, wherein the generating comprises generating a pan command in response to a rotation of the camera simulating device about an axis orthogonal to the ground plane.

45. A method in accordance with claim 43, wherein the generating comprises generating any one of a tilt command and a roll command in response to rotations of the camera simulating device about axes parallel to the ground plane.

46. A method in accordance with claim 42, wherein the virtual camera control signal comprises at least one of a plurality of camera commands for controlling a virtual camera within a virtual environment generated by the software application, the plurality of camera commands comprising:
   a crane up command;
   a crane down command;
   a truck left command;
   a truck right command;
   a truck in command;
   a truck out command;
   a pan right command;
   a pan left command;
   a tilt up command;
   a tilt down command;
   a roll left command;
   a roll right command;
   a zoom in command; and
   a zoom out command.

* * * * *

INTER PARTES REEXAMINATION CERTIFICATE (1187th)
United States Patent
MacIntosh et al.

(10) Number: US 7,403,220 C1
(45) Certificate Issued: Oct. 16, 2015

(54) APPARATUS, METHODS, AND SYSTEMS FOR VIEWING AND MANIPULATING A VIRTUAL ENVIRONMENT

(75) Inventors: David MacIntosh, San Diego, CA (US); David Morelock, Santee, CA (US); Joseph Grand, San Diego, CA (US)

(73) Assignee: GAMECASTER, INC., San Diego, CA (US)

Reexamination Request:
No. 95/000,493, Aug. 14, 2009

Reexamination Certificate for:
Patent No.: 7,403,220
Issued: Jul. 22, 2008
Appl. No.: 11/177,049
Filed: Jul. 9, 2005

Related U.S. Application Data

(60) Provisional application No. 60/603,708, filed on Aug. 23, 2004.

(51) Int. Cl.
*A63F 13/98* (2014.01)

(52) U.S. Cl.
CPC ...................................... *A63F 13/02* (2013.01)

(58) Field of Classification Search
None
See application file for complete search history.

(56) References Cited

To view the complete listing of prior art documents cited during the proceeding for Reexamination Control Number 95/000,493, please refer to the USPTO's public Patent Application Information Retrieval (PAIR) system under the Display References tab.

*Primary Examiner* — Fred Ferris, III

(57) ABSTRACT

Components for generating, reviewing, processing, storing, retrieving, analyzing, and optimizing information input to or output from a virtual environment. The components may be a video camera component, a stand-alone or device mountable on a tripod to permit a camera person to select from one or more views within a virtual environment, such as a video game being executed, and to provide alternative views within the confines of the virtual environment. The component permits selection from multiple views and manipulation of the same, including a rotation leftward or rightward, a tilt upward or downward, a zooming inward or outward, a translation (for example, a track movement) leftward, rightward, forward, or backward, a rolling movement, and a camera position adjustment (for example, crane movement) upward or downward.

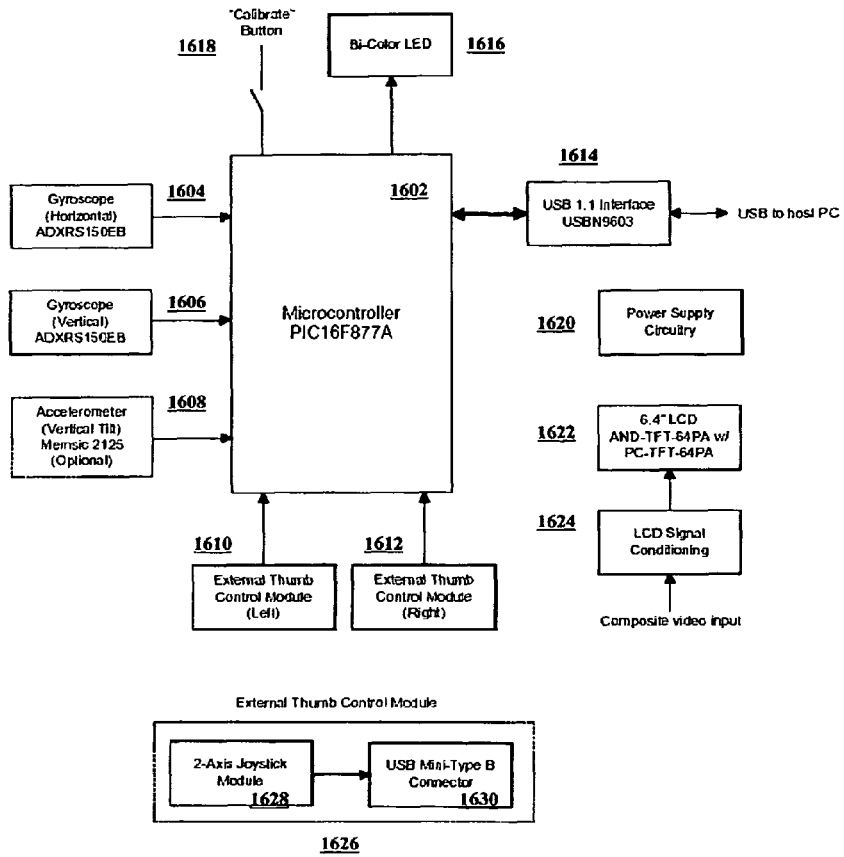

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-46 are cancelled.

\* \* \* \* \*